Jan. 31, 1967 K. H. ANDREN Re. 26,152

APPARATUS FOR PRODUCTION OF ELECTRICAL CONDUCTORS

Original Filed April 26, 1962 17 Sheets-Sheet 1

INVENTOR
KARL H. ANDREN
Lieber & Nillas
ATTORNEYS.

APPARATUS FOR PRODUCTION OF ELECTRICAL CONDUCTORS

Original Filed April 26, 1962 17 Sheets-Sheet 2

INVENTOR.
KARL H. ANDREN
BY
Lieber & Nilles
ATTORNEYS

APPARATUS FOR PRODUCTION OF ELECTRICAL CONDUCTORS
Original Filed April 26, 1962 17 Sheets-Sheet 3
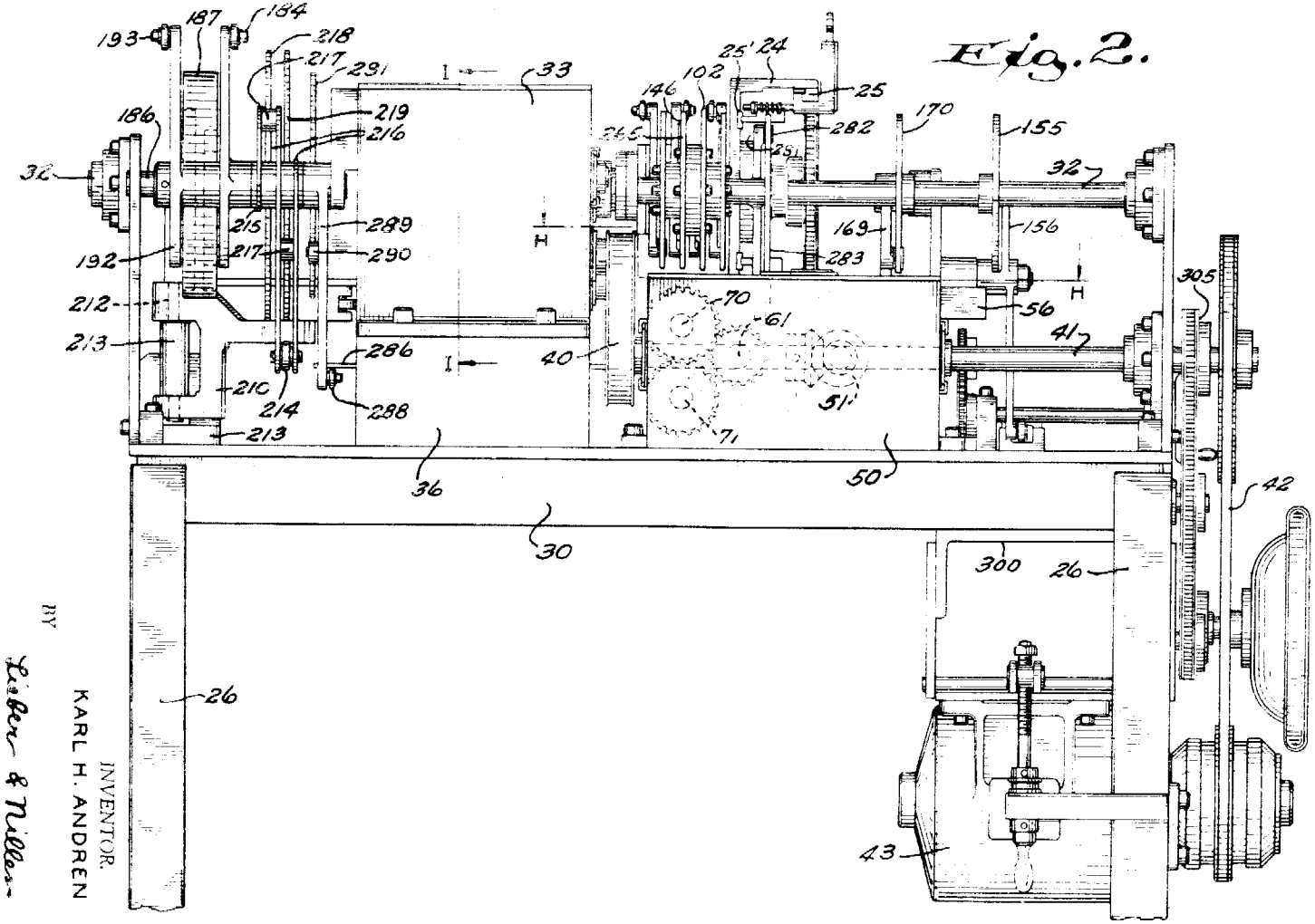
INVENTOR.
KARL H. ANDREN
BY
Lieber & Nilles
ATTORNEYS

APPARATUS FOR PRODUCTION OF ELECTRICAL CONDUCTORS

Original Filed April 26, 1962 17 Sheets-Sheet 4

INVENTOR.
KARL H. ANDREN
BY
Lieber & Nilles
ATTORNEYS.

APPARATUS FOR PRODUCTION OF ELECTRICAL CONDUCTORS

Original Filed April 26, 1962 17 Sheets-Sheet 5

INVENTOR.
KARL H. ANDREN

BY

Lieber & Nilles

ATTORNEYS

APPARATUS FOR PRODUCTION OF ELECTRICAL CONDUCTORS
Original Filed April 26, 1962 17 Sheets-Sheet 6
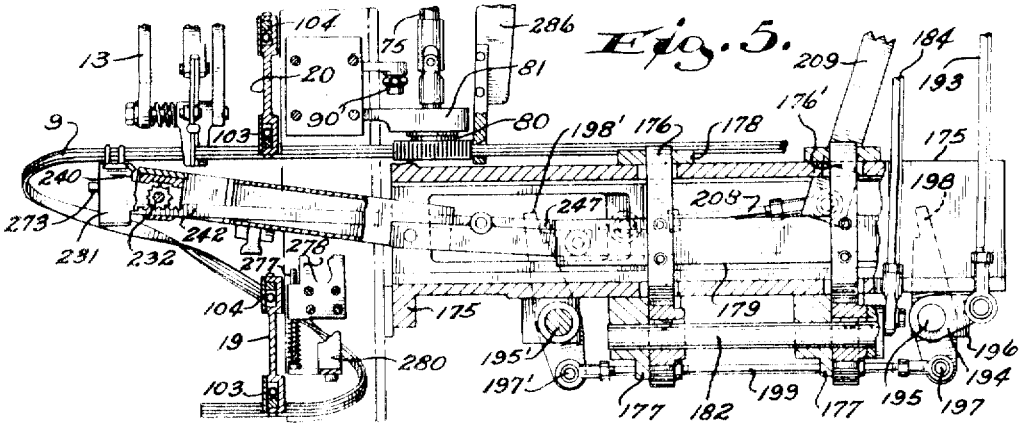
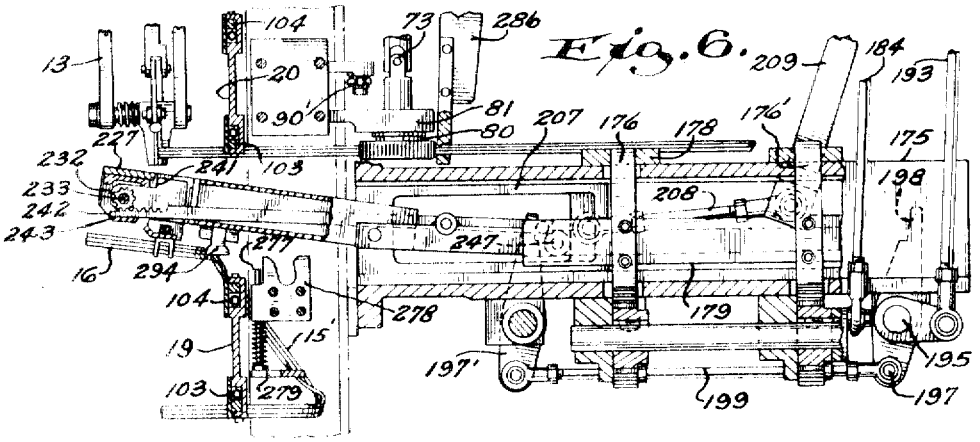
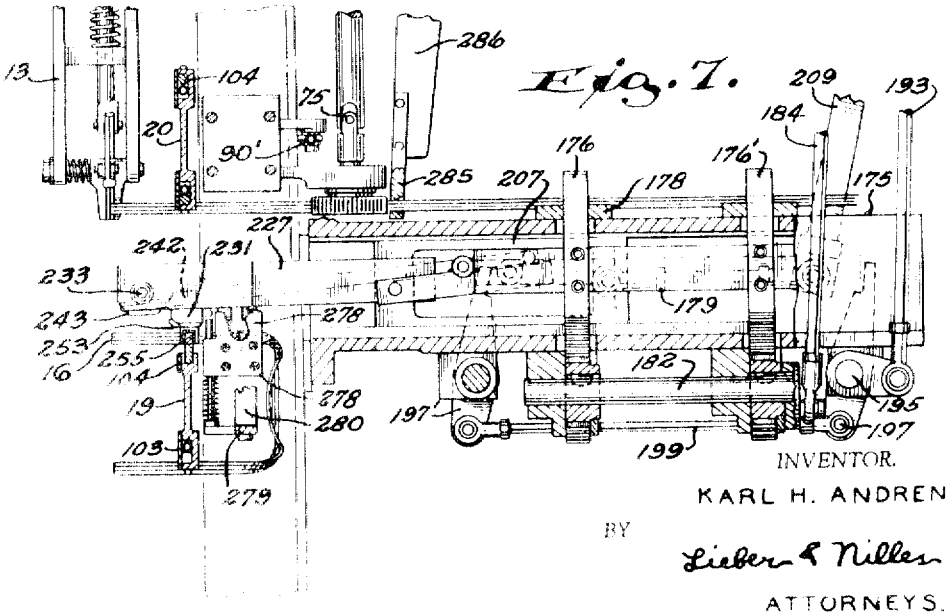
INVENTOR.
KARL H. ANDREN
BY
Lieber & Nilles
ATTORNEYS.

APPARATUS FOR PRODUCTION OF ELECTRICAL CONDUCTORS
Original Filed April 26, 1962 17 Sheets-Sheet 7
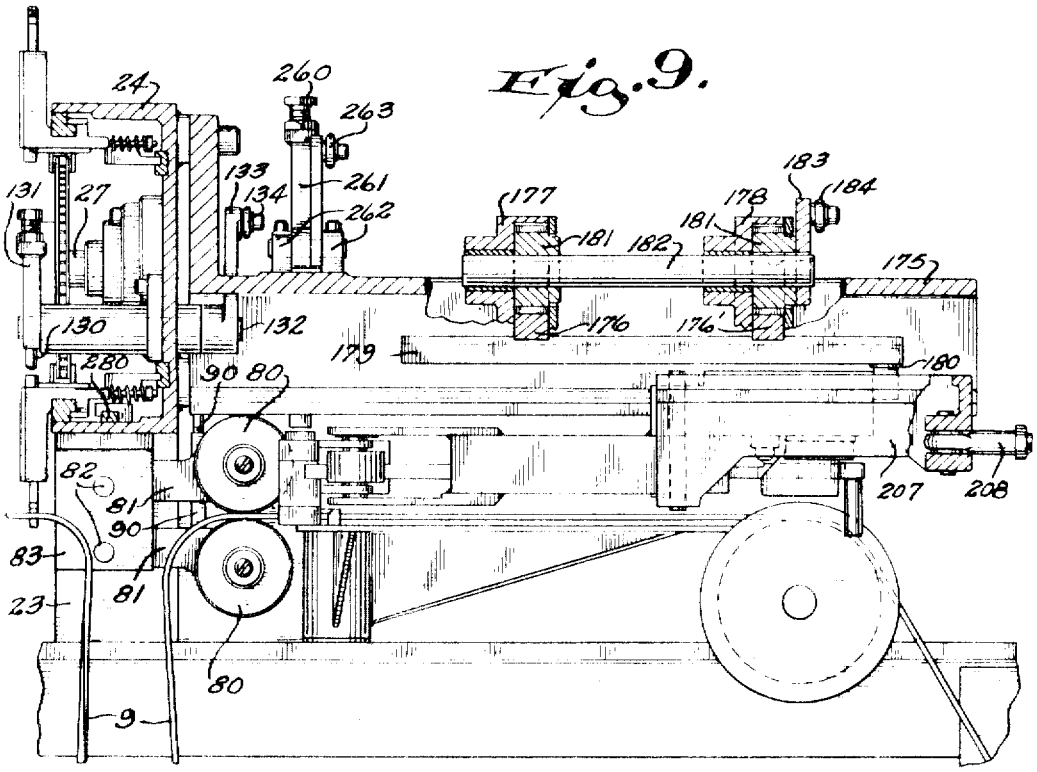
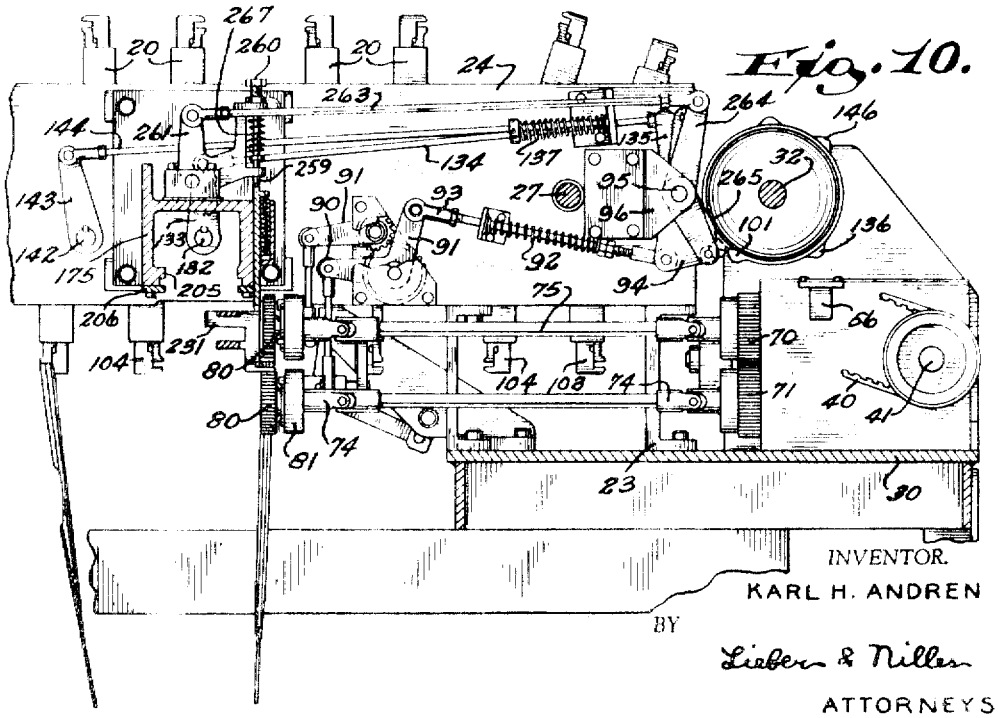
INVENTOR.
KARL H. ANDREN
BY
Lieber & Nillen
ATTORNEYS

INVENTOR.
KARL H. ANDREN

BY Lieber & Nilles

ATTORNEYS

APPARATUS FOR PRODUCTION OF ELECTRICAL CONDUCTORS

Original Filed April 26, 1962 17 Sheets-Sheet 9

INVENTOR.
KARL H. ANDREN
BY
Lieber & Nilles
ATTORNEYS.

APPARATUS FOR PRODUCTION OF ELECTRICAL CONDUCTORS

Original Filed April 26, 1962 17 Sheets-Sheet 10

INVENTOR.
KARL H. ANDREN
BY
Liebers & Nillen
ATTORNEYS.

APPARATUS FOR PRODUCTION OF ELECTRICAL CONDUCTORS

Original Filed April 26, 1962 17 Sheets-Sheet 11

INVENTOR.
KARL H. ANDREN
BY
Lieber & Nillen
ATTORNEYS.

APPARATUS FOR PRODUCTION OF ELECTRICAL CONDUCTORS

Original Filed April 26, 1962 17 Sheets-Sheet 12

INVENTOR.
KARL H. ANDREN

BY

Lieber & Nilles

ATTORNEYS.

APPARATUS FOR PRODUCTION OF ELECTRICAL CONDUCTORS

Original Filed April 26, 1962 17 Sheets-Sheet 13

INVENTOR.
KARL H. ANDREN

BY

Lieber & Nillas

ATTORNEYS.

APPARATUS FOR PRODUCTION OF ELECTRICAL CONDUCTORS

Original Filed April 26, 1962 17 Sheets-Sheet 14

INVENTOR.
KARL H. ANDREN

BY
Lieber & Nillen

ATTORNEYS

APPARATUS FOR PRODUCTION OF ELECTRICAL CONDUCTORS

Original Filed April 26, 1962 17 Sheets-Sheet 15

INVENTOR.
KARL H. ANDREN

BY

Lieber & Nilles

ATTORNEYS

APPARATUS FOR PRODUCTION OF ELECTRICAL CONDUCTORS

Original Filed April 26, 1962 17 Sheets-Sheet 16

INVENTOR.
KARL H. ANDREN

BY

Lieber & Nillen

ATTORNEYS

APPARATUS FOR PRODUCTION OF ELECTRICAL CONDUCTORS

Original Filed April 26, 1962 17 Sheets-Sheet 17

INVENTOR.
KARL H. ANDREN

Lieber & Nilles

ATTORNEYS

United States Patent Office

Re. 26,152
Reissued Jan. 31, 1967

26,152

APPARATUS FOR PRODUCTION OF ELECTRICAL CONDUCTORS

Karl H. Andren, West Allis, Wis., assignor to Artos Engineering Company, Milwaukee, Wis., a corporation of Wisconsin Original No. 3,201,848, dated Aug. 24, 1965, Ser. No. 306,499, Sept. 4, 1963, which is a division of Ser. No. 190,402, Apr. 26, 1962, now Patent No. 3,283,398, dated Nov. 8, 1966. Application for reissue Apr. 18, 1966, Ser. No. 546,126

14 Claims. ( Cl. 29—33)

Matter enclosed in heavy brackets [ ] appears in the original patent but forms no part of this reissue specification; matter printed in italics indicates the additions made by reissue.

The present application is a division of applicant's copending application, Serial No. 190,402, filed April 26, 1962, *now Patent No. 3,283,398*, and relates primarily to the provision of an improved apparatus for rapidly and accurately producing successive electrical conductor cords of diverse kinds from a continuous supply wire.

This invention relates generally to improvements in the art of producing electrical conductors from cord wire stock, and it relates more specifically to an improved apparatus for accurately manufacturing conductors of various types and lengths from continuous cord wire in rapid succession.

A number of different kinds of machines for producing various types of electrical conductors from cord wire have heretofore been proposed and used quite extensively, but due to the tremendous demand for such conductors and to the fact that the conductor requirements are becoming more intricate and that successive conductors of each type must be produced identically and with utmost precision, these prior mechanisms have failed to meet all of the commercial demands and requirements. In these so-called "electric cords," two or more insulation-coated wires have plastic coatings which are molded together laterally, and in order to properly apply terminals of various types, the coating at the opposite ends of each cord wire must be slit to separate the individual strands, and usually the insulation must also be removed at these wire ends before the terminals can be attached thereto. The terminals used in these machines are fed into the attaching mechanisms in the form of strips from which the individual terminals must be severed as required.

Most of the prior conductor cord producing machines have been restricted either to applying a terminal only to one end of each wire or cord, or to the opposite ends of a single wire only. With the prior machines wherein a terminal was attached to each end of a single wire, these terminals were also applied successively in the same operating zone, thereby materially limiting the speed of operation and the capacity of the machines. Then, too, in all prior machines, the terminal attaching zones were very restricted as to sizes and types of terminals that could be attached therein, and none were capable of applying several different kinds of terminals to each of the opposite ends of a cord. With the restricted attaching zones of the previous mechanisms, it was extremely difficult to feed along ground pin terminals into proper position for attachment with required accuracy and at high speed.

The present invention therefore contemplates the provision of apparatus whereby higher speed of production is made possible with far greater accuracy and range of control, and which is also effective for producing conductor cords having predetermined lengths adjustable during normal operation [which could not be accomplished with any prior apparatus] *with full and complete access being afforded to both sides of the conductor cords and the conveying mechanism therefor.*

In attaining these objects, an apparatus is provided which includes wire clamping and conveying mechanism for predetermined wire lengths in which laterally spaced clamps for receiving and gripping spaced portions of the wire lengths are advanced *along a rectilinear path* in single file succession, and the invention also contemplates feeding means which includes a gripping device operable to draw predetermined lengths of wire from a supply reel past a cutting zone and for thereafter bringing the trailing end and the leading end of the severed wire length into laterally spaced juxtaposition within adjacent clamps.

A clear conception of the construction and operation of a typical machine embodying the invention and adapted for effecting automatic production of electrical conductors from cord wire may be had by referring to the drawings accompanying and forming a part of this specification wherein like reference characters designate the same or similar parts in the various views.

FIGURE 2 is an end view taken from the left of the same machine as viewed in FIGS. 1a and 1b;

FIG. 4 is an enlarged horizontal section through a portion of the same machine, viewed from the left and taken approximately along the line A—A of FIG. 1a;

FIG. 5 is a similarly enlarged horizontal section through the machine, also taken along the line A—A of FIG. 1a showing the mechanism in one position;

FIG. 6 is a similar section taken along the line A—A but showing the mechanism in another operating position;

FIG. 7 is also a similar section taken along the line A—A, but also showing the mechanism in still another operating position;

FIG. 9 is a more complete vertical section taken along the line C—C of FIG. 3a, but showing the mechanism at a different time from that of FIG. 8;

FIG. 10 is a longitudinal vertical section through the rear of the same machine, taken along the line D—D of FIG. 3a;

Figure 1A:
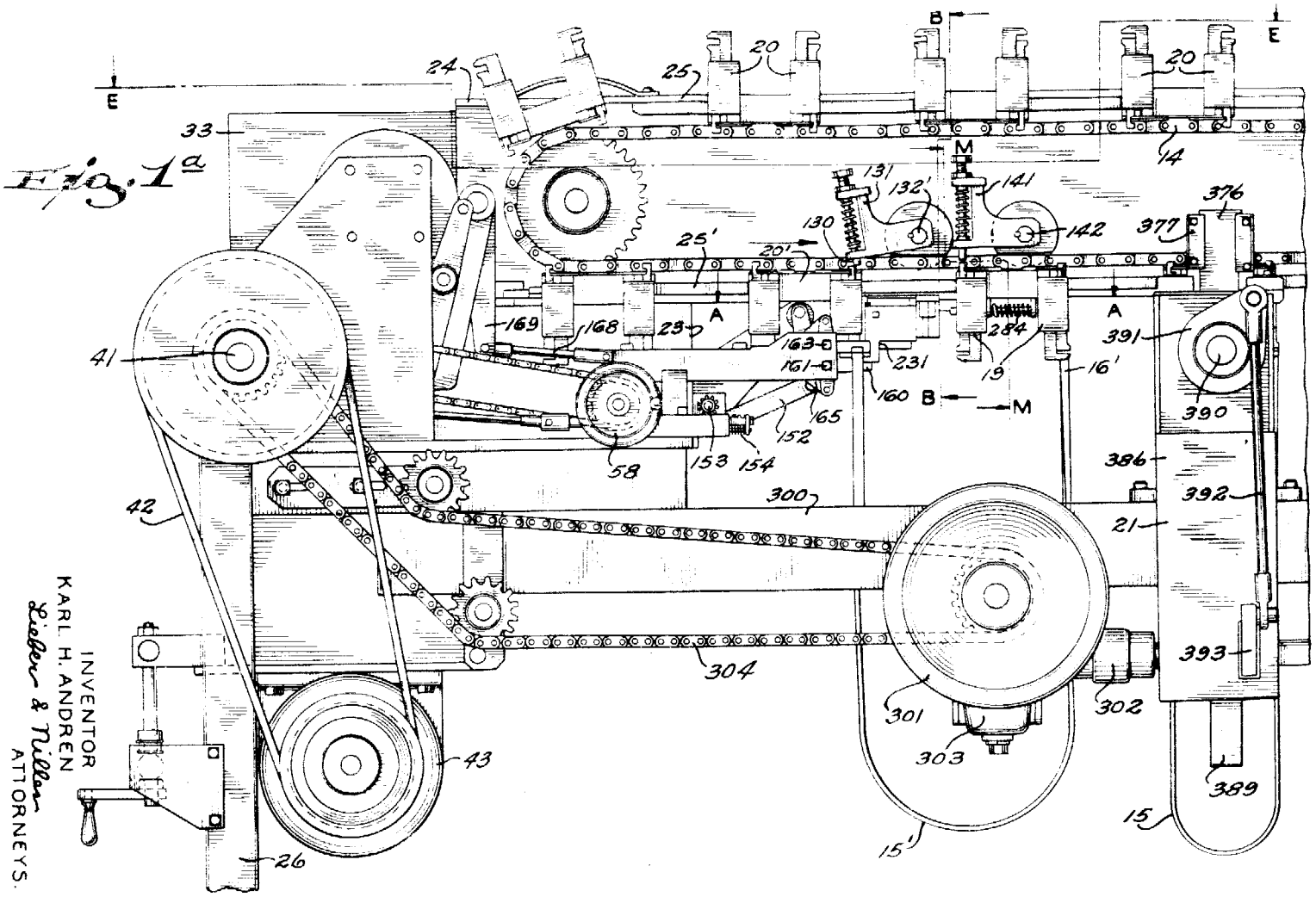
FIGURE 1a is a side elevation of the front half of a commercial machine for producing electrical conductors from cord ribbon.
Figure 1B:
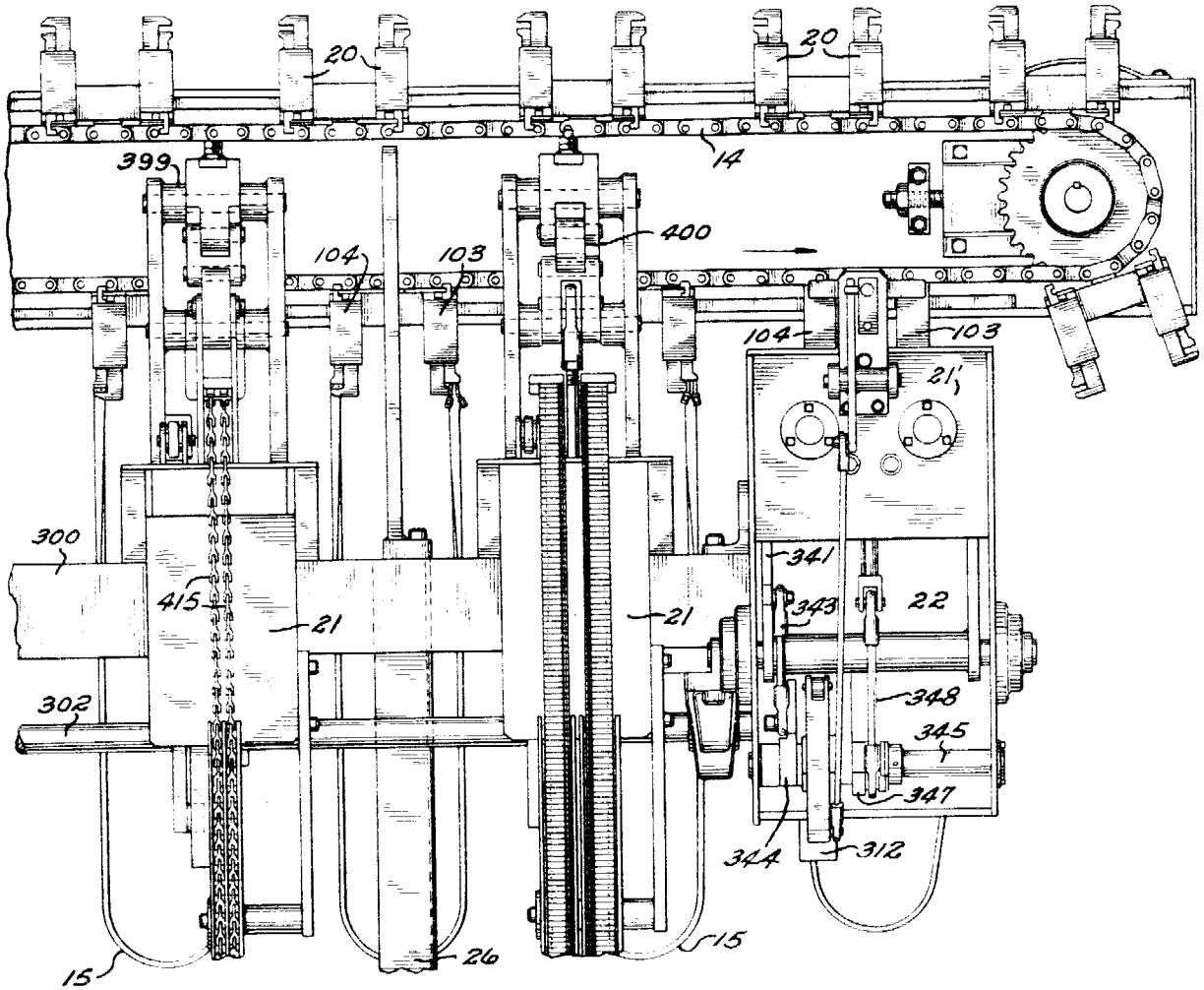
FIGURE 1b is a side elevation of the rear half of the same machine.
Figures 3A, 3B:
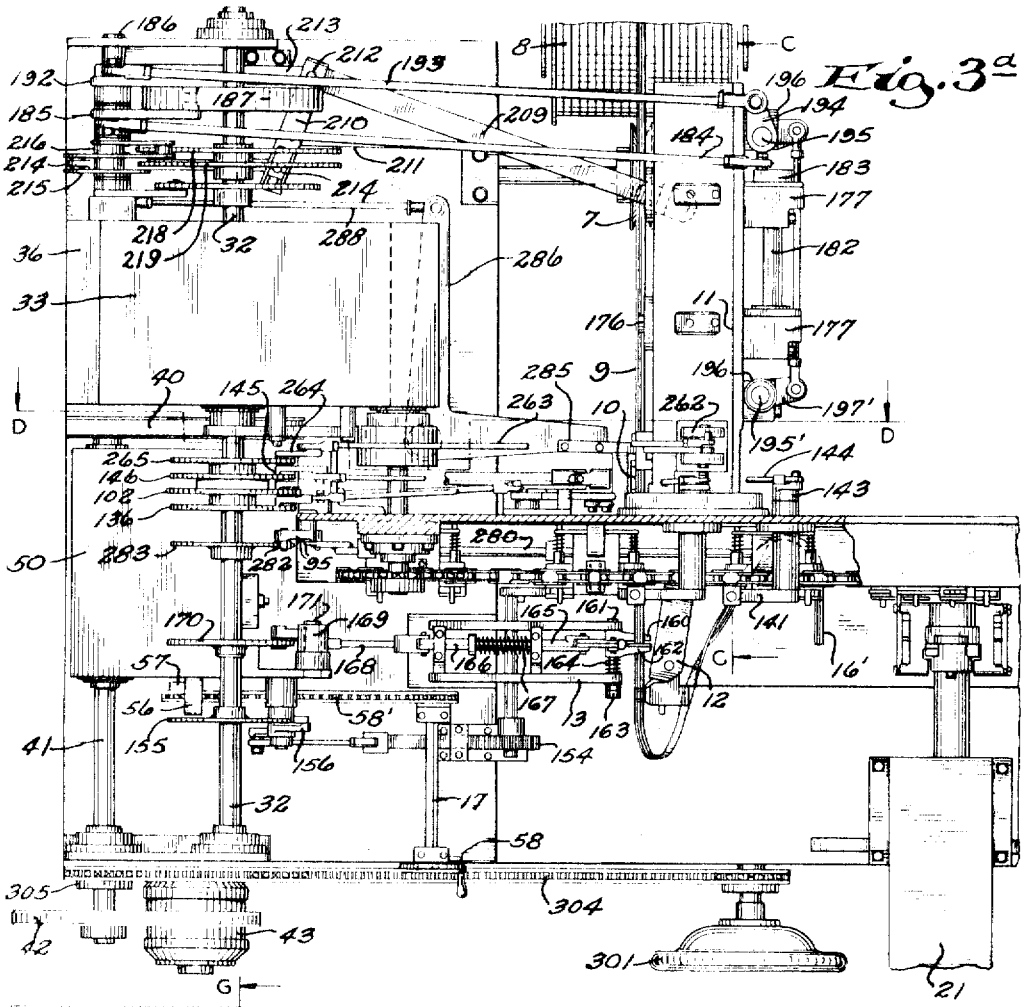
FIG. 3a is a top view of the front end of the machine, a partial section having been taken along the line E—E of FIG. 1.
FIG. 3b is a top view of the rear end portion of the machine with a small portion thereof broken away.
Figure 15:
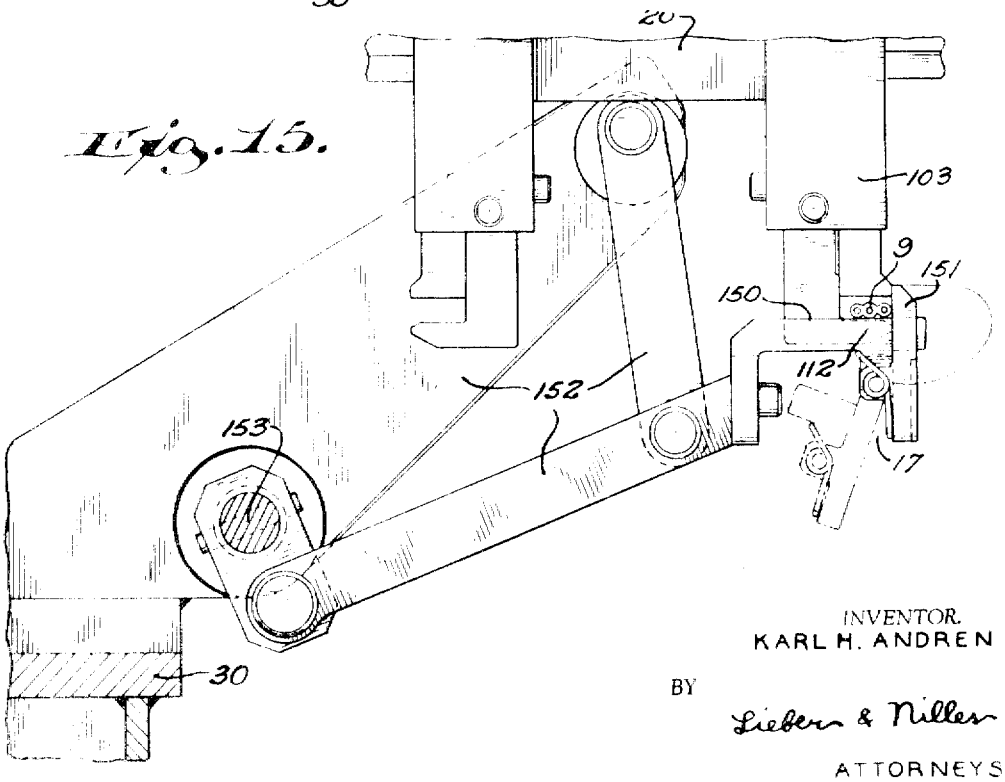
FIG. 15 is an enlarged side view of a fragment of the cord gathering mechanism shown in FIG. 1a behind other structure.

Referring to the drawings, the conductor production mechanism shown therein by way of illustration comprises in general, a cable or cord feeding device 10 adapted to withdraw continuous cord stock 9 from a supply reel 8; a conveyor loading device 11 for actuating a cord stock transfer mechanism 12 with its gripper 231 (FIGS. 3a, 8 and 11); a cord gatherer 17 for assisting in gathering cord stock 9 withdrawn from the reel 8 (FIG. 15); a severer 13 for cutting successive predetermined lengths 15 of cord stock 9 from the continuous supply (FIGS. 1a, 3a); an intermittently movable endless chain conveyor 14 (FIGS. 1a, 3a, 15 and 17) having thereon a series of U-shaped carriers 20 having a first cord gripping member 19 and a second cord gripping member 19', for gripping and carrying the opposite ends 16 of each severed cord length 15 in juxtaposition; a number of interconnected cooperating units 21 disposed at different positions along the path of advancement of the cord carriers 20 by the conveyor 14 and being operable to successively slit, strip, stagger cut, and attach various types of terminals to both ends 16 of each cord length 15; and mechanism for finally removing the finished conductors at an unloading station 21' and for depositing them into a receiver 22 adapted to be unloaded during normal operation of the machine (FIGS. 1b and 3b).

Figure 12:
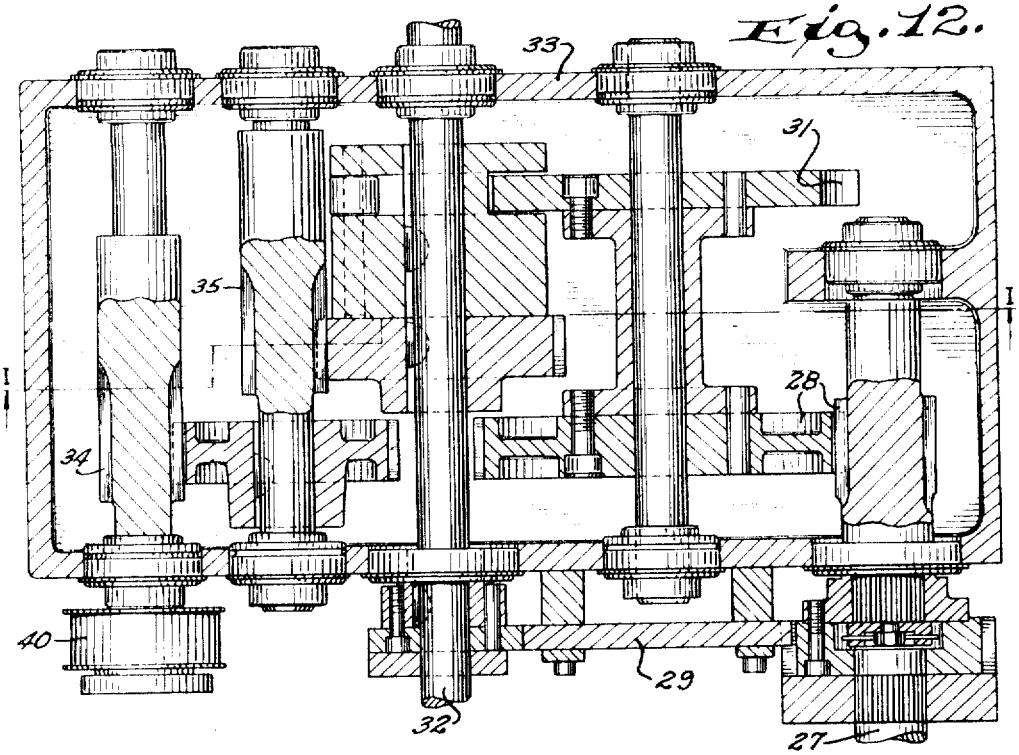
FIG. 12 is an enlarged section taken horizontally through the upper conveyor driving gear box of FIG. 2, taken along the line K—K of FIG. 13, and showing the internal mechanism.
Figure 13:
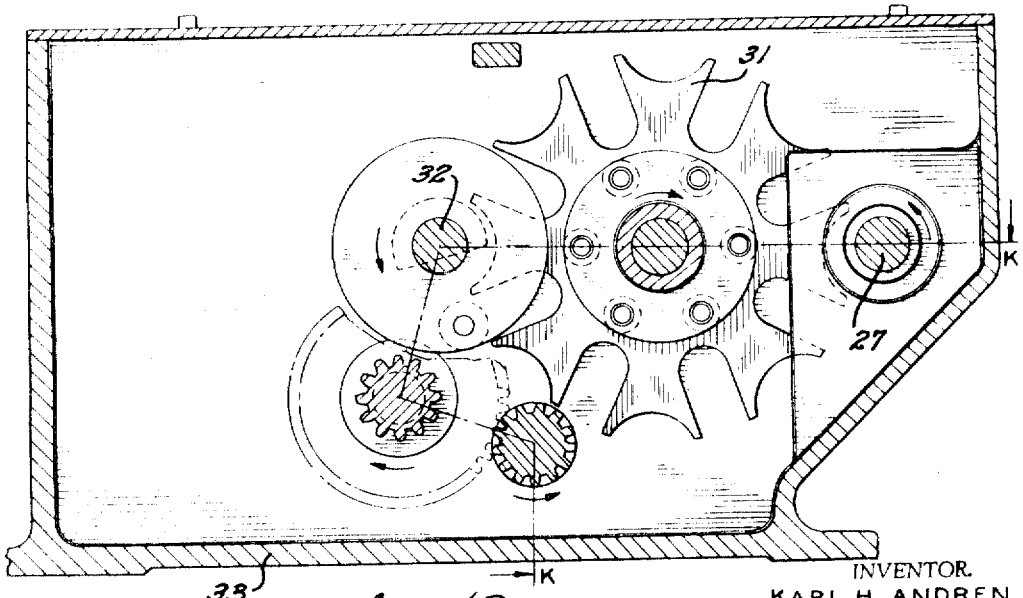
FIG. 13 is a vertical section through the conveyor drive box of FIG. 12, taken along the line I—I of FIG. 2.

The carriers 20, are secured to the endless chain of the conveyor 14 equidistant apart and are adapted to engage fixed parallel guide bars 25, 25' secured to a sturdy channel beam 24 firmly attached with spacers 23 to a main table frame 30 supported on legs 26 (see FIGS. 1a to 3 and 16). The conveyor 14 is intermittently operable from an upper drive box 33 (FIGS. 2, 12 and 13) mounted on spacers 36 carried by the frame 30, and is adapted to be driven by a shaft 27 and intermeshing gears 28 which are indexed by a Geneva drive 31, this shaft being locked during the dwell period by a cam actuated locking element 29. The Geneva drive 31 is driven from a main indexing shaft 32 journalled in the drive box 33 and which shaft in turn is driven by reduction gears 34, 35 and by a timing belt drive 40 through a main drive shaft 41 and another belt drive 42 from an electric motor 43 (FIGS. 2 and 3*a*).

Figure 14:
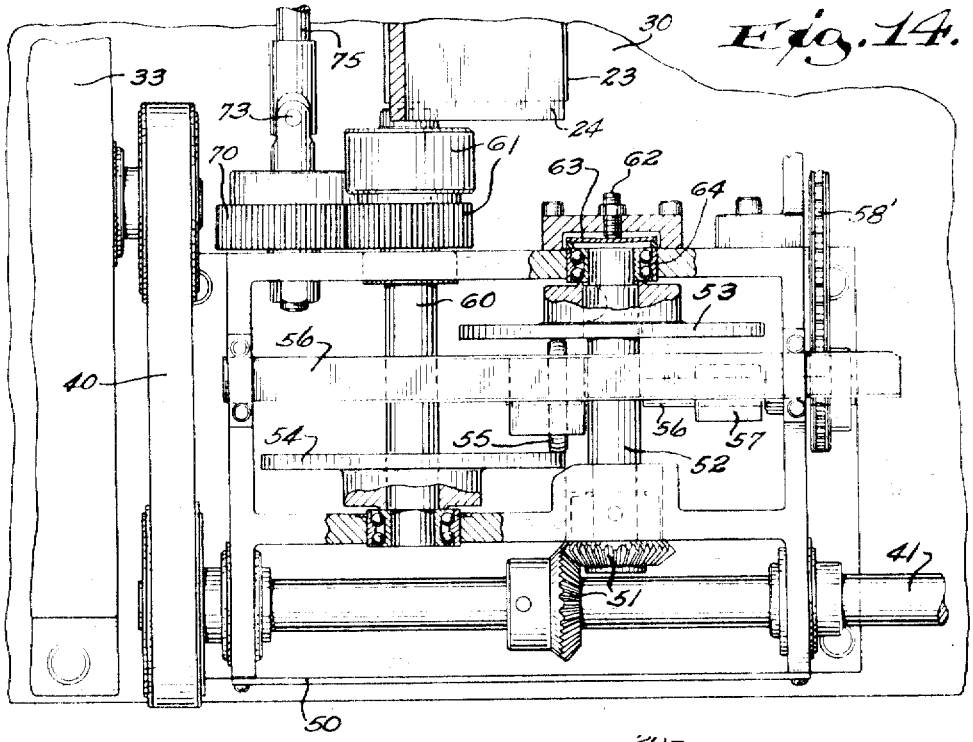
FIG. 14 is an enlarged top view of the lower variable speed drive box with top cover removed and with fragmentary sections as shown in FIG. 2, taken along the line H—H thereof.

The drive shaft 41 is journalled in a lower drive box 50 also carried by the table 30, and provides a variable speed friction drive for the cord feeding device 10 (FIGS. 3a and 14), through bevel gears 51, a drive shaft 52, a driving friction disc 53 coatcing through a friction roller 55 with a friction disc 54 mounted on a drive shaft 60, which shaft also carries a one-way clutch gear 61. The roller 55 is axially adjustable by means of a freely mounted positioning bar 56 movable by a screw 57 adapted to be rotated by a hand wheel 58 through a chain drive 58', and the axial static friction pressure required is exerted by set screw 62 pressing through the flat spring 63 on the thrust and radial bearing 64. The one-way clutch 61 is adapted to drive a pair of intermeshing gears 70, 71 (FIGS. 2 and 14) which are drivingly connected through universal joints 73 and drive shafts 75 with a pair of pinch rollers 80 journalled in levers 81 fulcrumed on pivots 82 in a bracket 83 which is suspended from the channel bar 24 (FIGS. 4, 5, 6, 7, 9, and 10).

The pinch roller supporting levers 81 are movable toward and away from each other by connecting rods 90 attached to geared levers 91 operable by a compression spring 92 attached to the channel bar 24 and which coacts with another connecting rod 93 attached to one of the levers 91 and to a bell crank 94 swingable about a fulcrum 95 carried by a bracket 96 on the channel bar 24 (FIG. 10). The bell crank 94 is provided with a roller adapted to be engaged by a cam lug 101 on a cam 102 mounted upon the shaft 32 to momentarily separate the spring loaded pinch rollers 80 equidistant from the opposite sides of the ribbon cord 9 through the linkage just described, and an attendant may also adjust the feeding length of the cord stock 9 by manipulating the hand wheel 58 while the machine is operating.

Figure 16:
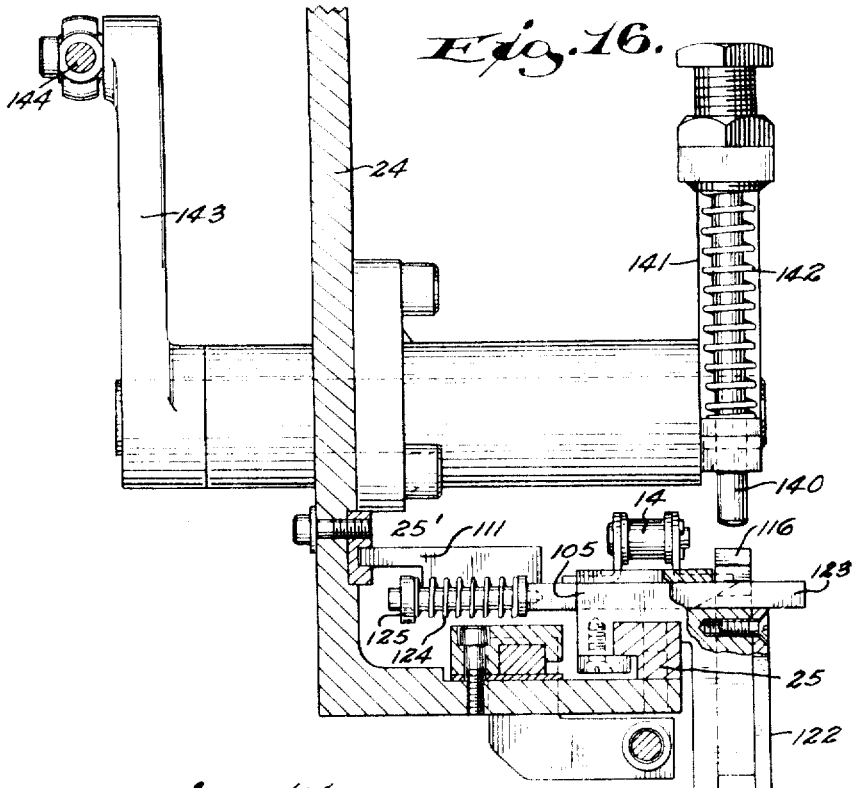
FIG. 16 is an enlarged transverse section taken along the line M—M of FIG. 1a, showing the cord clamping mechanism.
Figure 17:
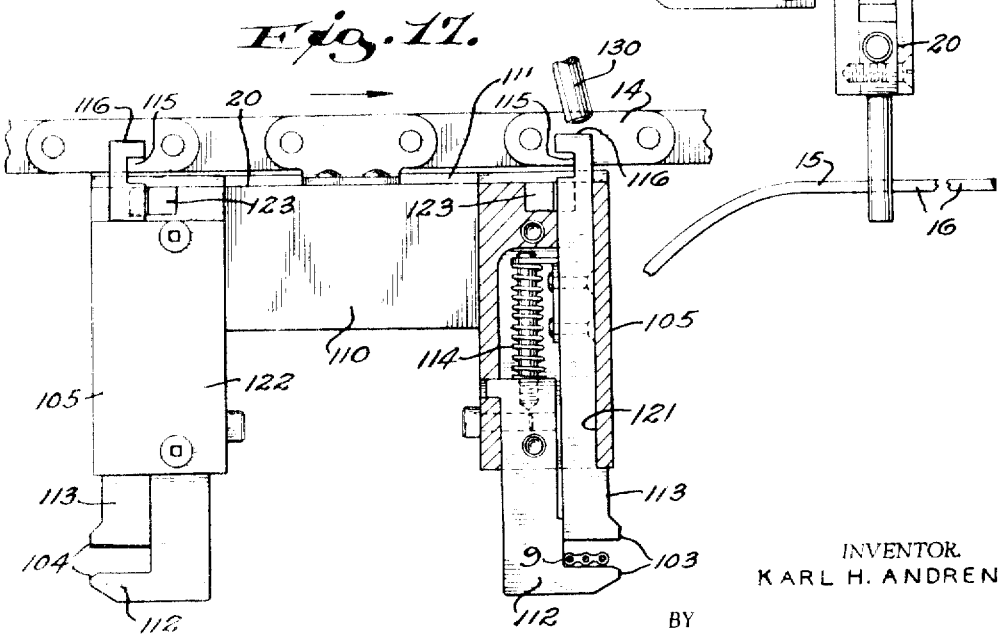
FIG. 17 is an enlarged part sectional side elevation of one of the cord length carriers.
Figure 18:
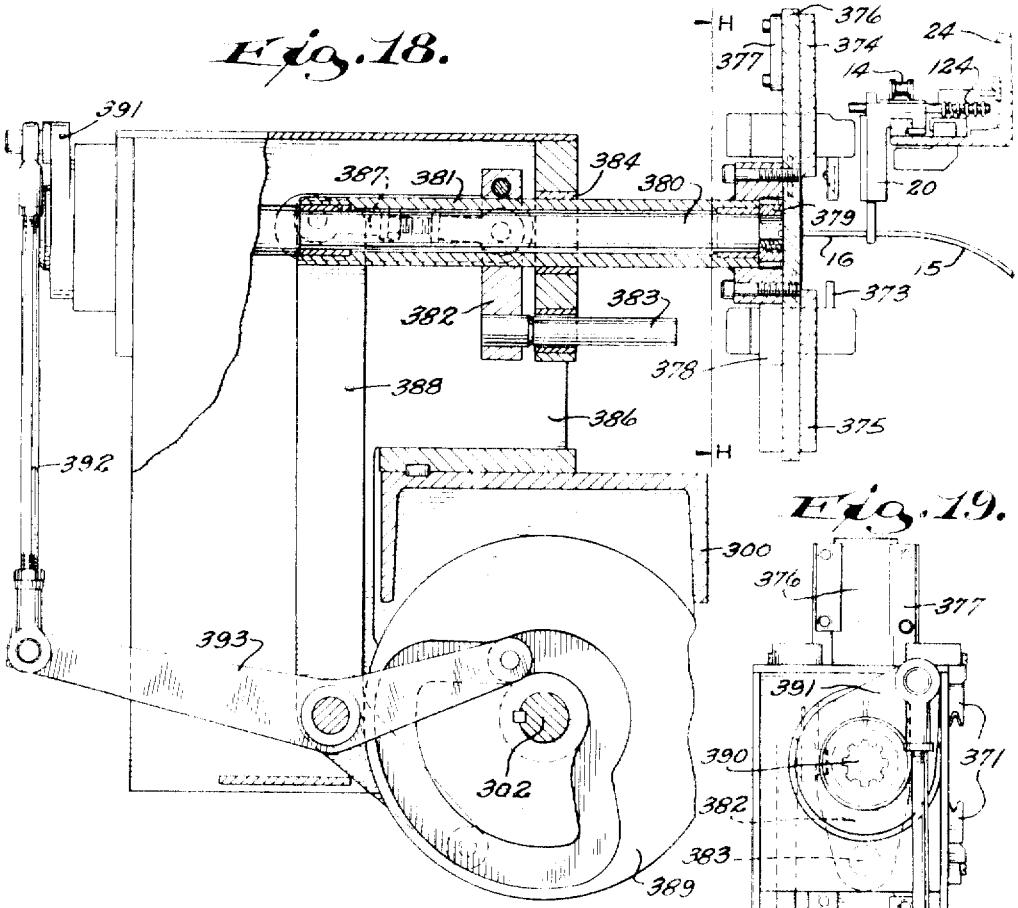
FIG. 18 is an enlarged part sectional view of the cord end slitting and stripping unit of the machine taken approximately along the dividing line of FIGS. 1a and 1b.
Figure 19:
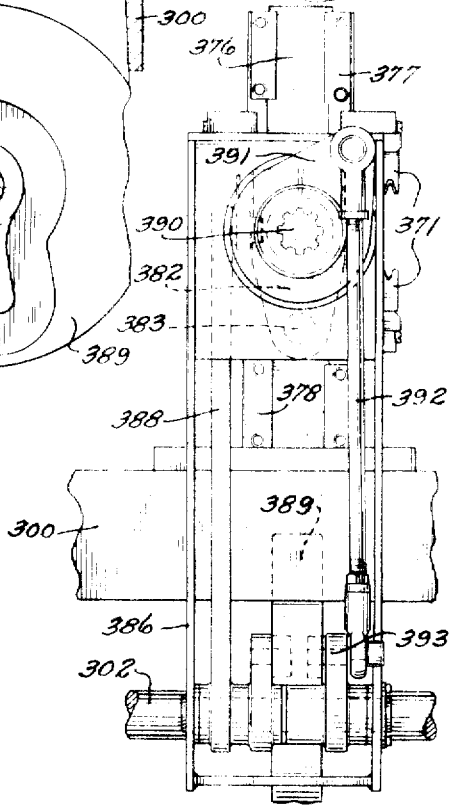
FIG. 19 is a similarly enlarged end view of the unit shown in FIG. 18.
Figure 20:
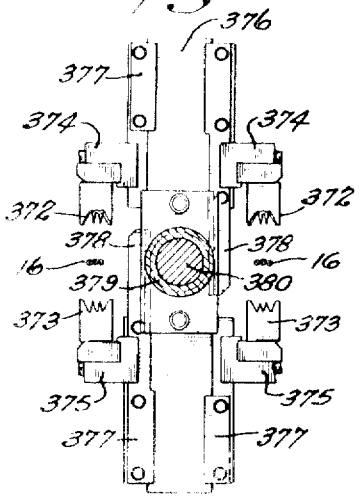
FIG. 20 is a likewise enlarged vertical section through the unit of FIG. 18 taken along the line H—H of FIG. 18.

Each of the U-shaped carriers 19, 20 and 20' which are attached to the endless chain conveyor 14 comprises a leader clamp 103 adapted to engage the leading end of a cord length and a trailer clamp 104 adapted to engage the trailing end of the same looped cord length after same has been severed from the cord stock 9, and to firmly hold and carry these two ends in juxtaposition (FIGS. 1b, 16 and 17). The two clamps 103, 104 are interconnected by a frame 105 forming two separate parallel guideways which engage the guide bar 25, and are rigidly united by a central part 110 to which a short guide block 111 adapted to engage the other guide bar 25' is attached.

Each of the carrier clamps 103, 104 is provided with a fixed anvil 112 and a sliding jaw 113 which is normally retained in open position by a spring 114 and is confined in a guide slot 121 by a cover plate 122. The end of the slide jaw 113 nearest to the conveyor chain is provided with a notch 115 within which a locking wedge 123 is slidably engaged and tends to move outwardly under the influence of a spring 124 coacting with a cross bar 125, but the wedge is prevented from moving until the end 116 of the jaw 113 is pressed down upon the yielding cord 115 whereupon the jaw 113 will be locked into that position by the wedge. The cord will thus remain clamped as compressed in the leading jaw 103 until the carrier 20 arrives at the unloading station 21' whereupon the locking wedge is pushed back and the jaw 113 is released by its spring 114, as will be later described.

Whenever the indexing and transporting conveyor 14 has indexed the advancing carrier 19 with a cable end 16' of a loop 15' which is carried across the pathway of conveyor 14 from the supply reel 8 through a drag block 285 and between the pinch rollers 80 by the gripper 231, said conveyor also advances the second carrier 20' to a dwelling period in a first loading position for loading its leading clamp 103. Said clamp with its open jaws 112, 113 has just received a median portion of the cord 9 as will be described later. The upper end 116 of this jaw 113 will then be depressed by the spring loaded plunger 130 to clamp and lock said cord 9 (FIG. 17), and said cord will be severed by the severer 13. Said spring loaded plunger 130 is mounted on a lever 131 secured to an operating shaft 132 journalled in a bracket 132' carried by the channel 24 (FIGS. 1a, 8, 9, and 10). The other end of this shaft is secured to a lever 133 connected by a drag link 134 to the upper end of a cam lever 135, the opposite end of which carries a roller adapted to engage a cam 136 and biased toward this cam by a spring 137. When the cord 9 has been severed, the end carried by the gripper 231 becomes the trailing end 16 of the new cord 15', and this end 16 is turned around and inserted into the trailing clamp 104 to bring these cord ends into flat juxtaposition as will be described later. The end 116 of the clamping jaw 113 of the clamp 104 is operated in a similar manner by a spring pressed plunger 140, a lever 141, a shaft 142, a lever 143, and a drag link 144 through a cam lever 145 which is engageable with a cam 146 and is biased toward the latter by a spring 147 (FIGS. 3a, 10 and 16).

In order to insure that the cord 9 will be properly transferred from the cord stock transfer mechanism 12 and delivered to the leading clamp 103, a cable support 150 having a hook 151 for lifting the cord 9 carried by the gripper 231 slightly above the anvil 112 of the approaching clamp 103 is provided, and this hook also provides proper lateral or side location of said cord. This cable support 150 is adapted to swing in timed relation as indicated in dot-and-dash lines in FIG. 15, and is operable by a multiple linkage 152 mounted on the frame 30 which is actuated by an oscillatory shaft 153 cooperating through a spring biased pinion and rack 154 and with cam lever 156 with a cam 155 carried by the shaft 32 (FIGS. 2 and 3a).

The cable cutting device 13 is also supported on the frame 30 and comprises a lower knife 160 mounted on a bell crank pivoted on a shaft 161, an upper knife 162 mounted upon another bell crank attached to and swingable by a shaft 163, a spring 164 for urging the knives 160, 162 toward each other like a pair of shears, and a pair of links 165 connecting both knives with a slidable rod 166 (FIGS. 1a, 2 and 3a). The rod 166 is urged in one direction by a compression spring 167 to normally maintain the knives 160, 162 in open position, and this rod coacts through linkage 168 and a lever 169 fulcrumed on a shaft 171 with a cam 170 carried by the cam shaft 32.

The conveyor loading device (FIGS. 4 to 11) is confined within a housing 175 having inverted U-shaped cross section and which is firmly secured to the channel bar 24. Two reciprocable racks 176, 176' are disposed within this housing 175 but have their supporting bearings 177, 178 mounted externally of the housing, and these racks support a grooved bar 179 which is adapted to engage a roller 180. The racks 176 are reciprocable by pinions 181 secured to a drive shaft 182 journalled in the bearings 177, and the shaft 182 has a crank 183 attached thereto and which is operable by a link 184 connected to a cam actuated lever 185 fulcrumed on a shaft 186 and which is adapted to be actuated by a cam groove formed in one side of a rotary cam 187 (FIGS. 2 and 3a). The opposite side of the cam 187 is provided with another cam groove which coacts with a cam lever 192 also fulcrumed on the shaft 186 and which is connected by a link 193 with a rocker arm 194 secured to the upper end of an upright shaft 195 journalled in a bearing block 196 mounted upon the housing 175. This shaft 195 has another rocker arm 197 with a contact surface 198 and is connected by a link 199 to another similar rocker arm 197' on an upright shaft 195' with a contact surface 198' (see FIGS. 4 to 7), the function of which will be later described.

The lower portion of the housing 175 is provided with a guideway 205 and with gibs 206 (FIG. 10) adapted to cooperate with a reciprocable hollow frame shuttle 207 (FIGS. 8 and 9) which is operable by a link 208 connected to an end of a lever 209 (FIGS. 3a and 5 to 7). This lever 209 has its opposite end welded to one end of a pivot bar 210 and is also firmly connected thereto by a brace 211, and this assemblage is mounted on a pivot pin 212 which projects at both ends through a stand 213 mounted upon the frame 30. The other end of the bar 210 is connected by a link 214 to a rocker arm comprising plates 215 and a hub 216, and these plates carry rollers 217 adapted to coact with a master cam 218 and a conjugate cam 219 mounted on the cam and indexing shaft 32 (FIG. 2).

The opposite end of the shuttle 207 (FIGS. 4 to 8) is closed at the top and bottom and houses a shuttle arm 227, the medial portion of which passes through the hollow shuttle and is pivoted on a pin 229. The outer end of the shuttle arm 227 is bifurcated and carries a cord gripper 231 which is mounted for oscillation with an attached pinion 232 on a pin 233 carried by the member 230. The inner end of the shuttle arm 227 extends into the hollow shuttle 207 and carries a roller, the roller 180 coacting with the grooved bar 179. The cord gripper 231 together with its pinion 232 is movable between stops 240, 241, on the shuttle arm 227 of the shuttle 207, and the pinion 232 is rotatable by means of a rack 242 slidable along a grooved backing plate 243, and the end of the rack 242 remote from the plate 243 is supported and guided by a bracket 244 mounted on the shuttle arm 227. A spring loaded plunger 245 is also mounted on the arm 227 between the pivot 229 and the roller 180 and coacts with an abutment 246 on the rack 242 to alternately force the gripper 231 against the stops 240, 241 while this rack is being reciprocated by a depending pin 247 on the end of rack 242 contacting with the surfaces 198, 198' during reciprocation of the shuttle 207 by a drag link 208 (FIGS. 5 and 8).

Figure 8:
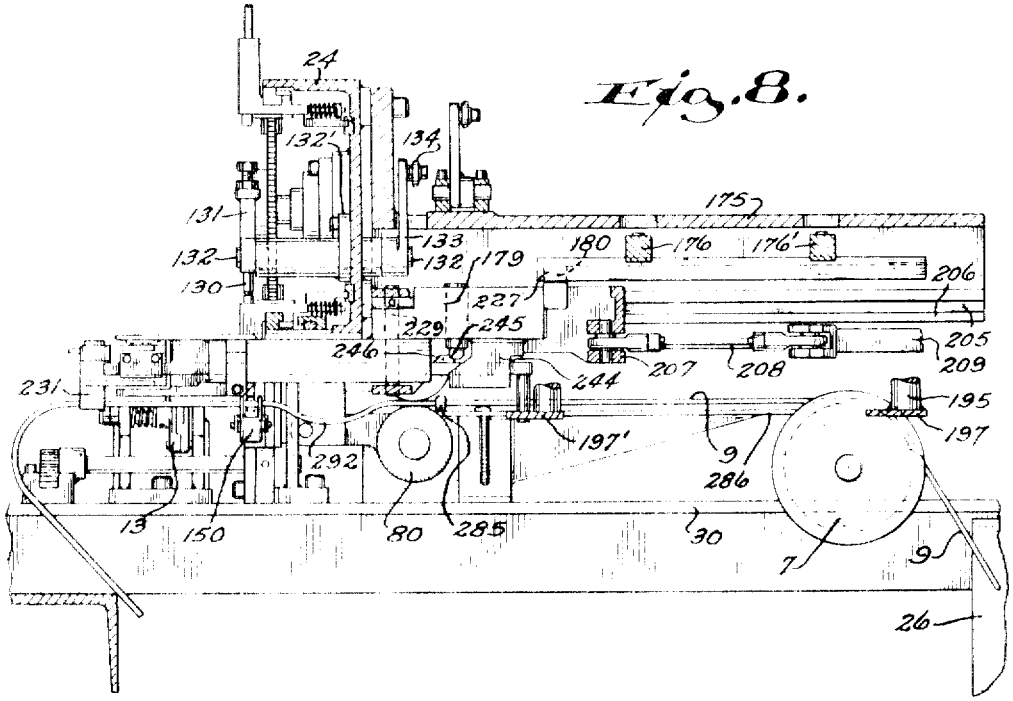
FIG. 8 is a vertical section through the machine taken along the line B—B of FIG. 1a but with some parts omitted for the sake of clarity.
Figure 11:
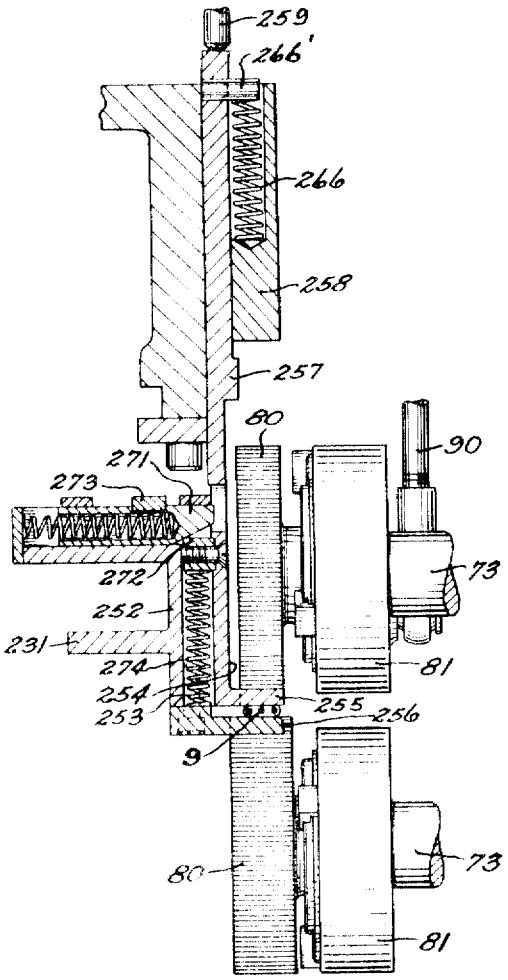
FIG. 11 is an enlarged fragment of a portion of the mechanism shown in section in FIG. 10.

The cord stock gripper 231 comprises a body 252 having a gibbed guideway 253 coacting with a gripping slide 254 having a forked clamping foot 255 cooperating with a similarly forked plate 256 permanently attached to the body 252 (FIGS. 8, 9, and 11). The gripper is formed to straddle the path of advancement of the trailing clamps 104 of the carriers 20 secured to the conveyor 14, and the slide 254 projects upwardly within the guideway 253 and is adapted to be engaged to actuate the gripping foot 255 by means of a slide 257 slidably mounted in a plate 258 secured to the housing 175. The slide 257 engages the slide 254 so as to impart gripping pressure to the foot 255 against the cord stock 9, and the slide 257 is operably by a plunger 259 coacting with a strong spring 267 adjustable by means of a screw 260. The plunger 259 is mounted in a bell crank 261 which is pivoted in blocks 262 mounted on the housing 175 and is operable by a drag link 263 from a cam lever 264 cooperating with a cam lug 265, and this linkage is biased against the cam by a spring 266 confined within the plate 258 as by a pin 266' (FIGS. 2, 3a, and 11).

The clamping pressure set up by the spring 267 is maintained in the cord gripper 231 by a spring pressed latch 271 coacting with a transverse key 272 permanently attached to the rear of the slide 254, and the assemblage remains clamped until the latch 271 operated by an integral projection 273 thereon is completely withdrawn from engagement with the key 272, when a spring 274 in a slot in the body 252 releases the slide 254 to open the gripping foot 255 and release the cord 9. This action takes place whenever the cord length 15' has been severed from the stock supply and the trailing end of a severed length has been swung around and inserted in the trailing clamp 104 of the first carrier 19 and clamped therein by the plunger 140. Another adjacent spring returned plunger 277 passing through a recess in a dowel block 278 mounted beneath the channel 24 will then be operated by a plate 279 so as to release the clamp slide 254 by pushing the lug 273 away from the cross key 272 (FIGS. 5, 6, and 7).

The plate 279 is firmly attached to an end of a slide 280 which is biased with spring 284 and is movable along the channel 24 and has its other end connected to the lower portion of a cam lever 281 fulcrumed medially on the front end of the shaft 95 while its upper end carries a roller 282 coacting with a cam 283 on the shaft 32 (FIGS. 1a, 2 and 3a). The ribbon cord 9 which is withdrawn from the reel 8 is initially guided by a grooved pulley 7 and is thereafter threaded through a drag block 285 mounted on a bell crank 286 pivoted on the frame 30 and which is operable by linkage 288 from an end of a cam lever 289 pivoted at one end on the shaft 186 and which has a roller 290 between its end coacting with a cam 291 on the shaft 32 (FIGS. 2, 3a, and 8).

Figure 38:
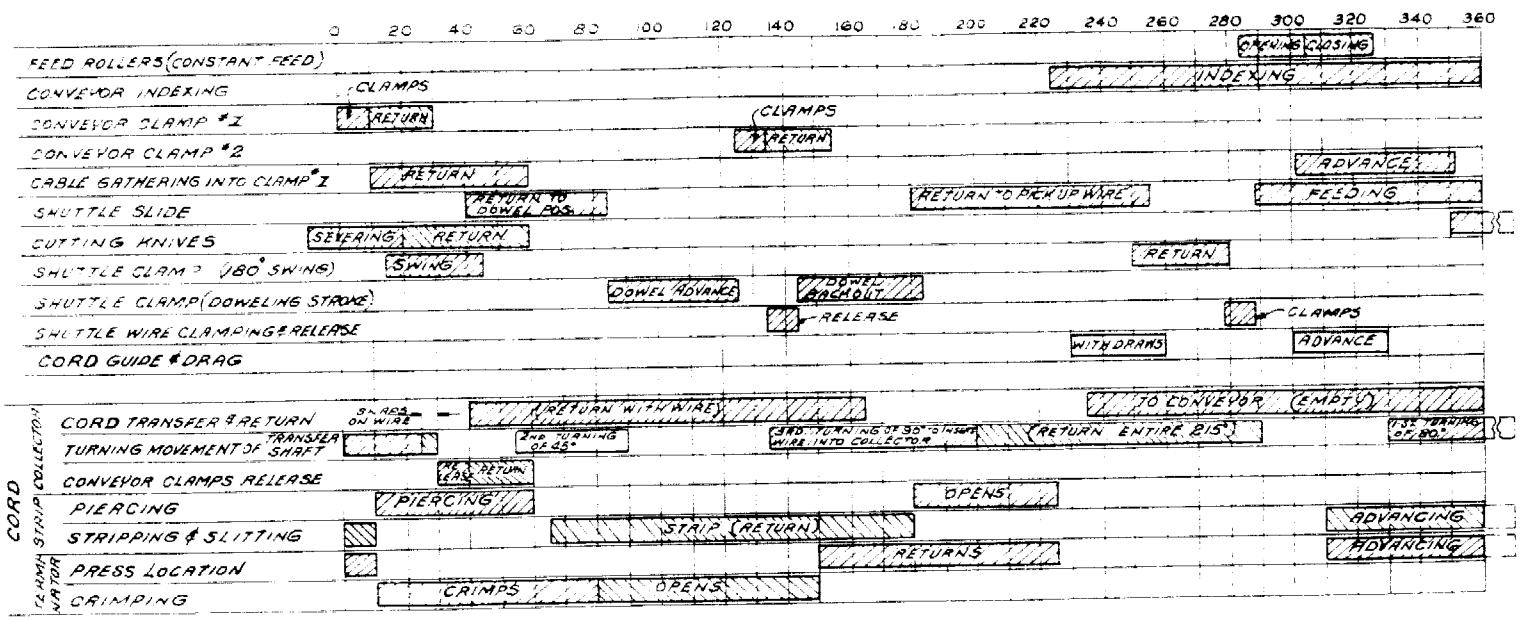
FIG. 38 is a timing diagram for the machine.

With this assemblage, the cable drag block 285 is normally adjacent to the pinch rollers 80 as in FIG. 8, the cable 9 is properly guided to enter between these rollers, the drag prevents them from overfeeding due to the free wheeling action of the clutch gear 61 and the ever-increasing weight of the sag or loop 292 in the cord as depicted by the timing diagram in FIG. 38; but when the drag block 285 is retracted from the rollers 80 and leaves the advancing cord 9 suspended between these rollers and the guide block, the open shuttle clamp 231 swings into the path of the taut cord and suddenly grips the same pulling the cord stock in the same direction due to advancement of the shuttle 207. The rollers 80 are then automatically separated to permit the clamp 231 to pass, and the drag block 285 thereafter returns to a position adjacent to these pinch rollers after the clamp has passed.

Figure 4:
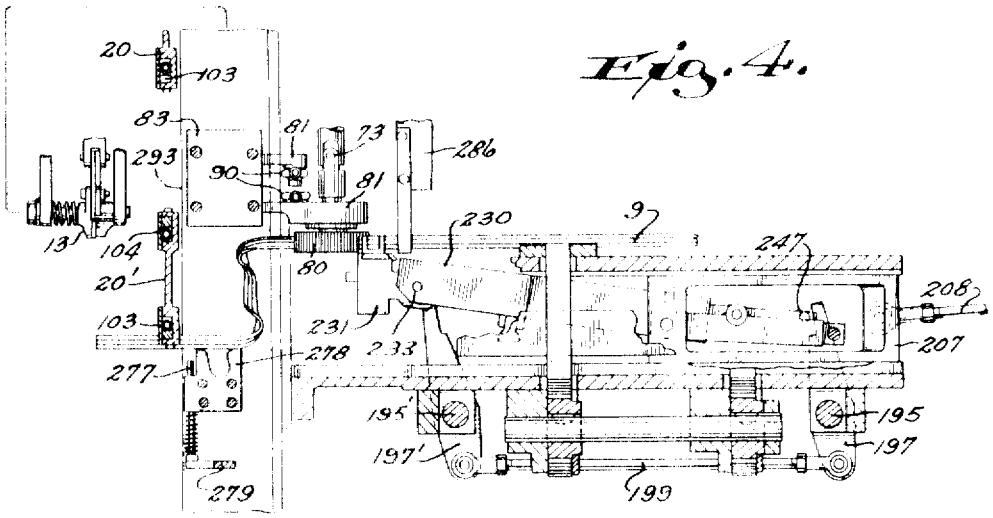

Meanwhile, the conveyor 14 is indexing with a cord carrier 20' temporarily blocking the path of the shuttle gripper 231 at 285° as in FIG. 4, but when this gripper reaches the path of advancement of the conveyor chain, the trailing clamp 104 of the adjacent carrier 20' has crossed the path of the gripper 231 which now enters and passes through the enlarging space 293 of FIG. 4, thereby pre-positioning the open approaching leading clamp 103 of the next clamp carrier 20. As this open clamp 103 approaches the still travelling cord 9, the cord gathering support 150 inserts the cord therein while the latter still continues to advance between said gatherer and the rollers 80 into a succeeding loop formation 292. When the shuttle gripper 231 has passed between the open knives 160, 162, these cutters begin to close; and when said gripper 231 reaches the end of its stroke as in FIG. 8 at 0°, the leading clamp 103 of the now adjacent carrier 20' is actuated by the plunger 130 to clamp the cord 9. The knives 160, 162 then sever the cord length 15 from the supply cord 9 at the clamp 103, and the cable gripper 231 coacting with the trailing end of the severed length 15 is swung and turned around by the shuttle arm 227 and by the rocker arm 197' coacting with the pin 247, and this action pulls the rack bar 242 so as to rotate the pinion 232 associated with the clamp 231 (FIGS. 4, 5 and 6).

The shuttle 207 with arm 227 then begin their return stroke actuated by the link 208 and stop with the gripper 231 facing the trailing clamp 104 of the now first carrier 19. As the grooved bar 179 is operated by the racks 176, 176', it actuates the roller 180 on one end of the shuttle arm 227 to swing the opposite arm end to cause the shuttle gripper 231 to insert the trailing end of the cord length 15 into the open trailing clamp 104 of the first carrier 19. The plunger 140 is then actuated to close the clamp 104, whereupon the gripper 231 is released from the cord length 15' by the plunger 277 acting upon the projection 273 of the latch pin 271 which frees the slide 254 from clamping engagement with the cord supply 9. In order to obtain precise registration of the forked clamping foot 255 with respect to the trailing clamp 104, a rounded dowel plate 294 carried by the arm 227 is caused to engage the positioning block 278 mounted on the underside of the channel 24. After the gripper 231 has been released from the cord 9, the shuttle arm 227 backs out, and the shuttle 207 continues its return motion, and the rocker arm 197 with the engagement surface 198 causes the rack 242 to swing the gripper 231 back when same has passed the rollers 30 in order to engage the cord 9 when the guide and drag block 285 are withdrawn.

The speed of the shuttle 207 is timed to coincide with that of the cord 9 for the ordinary lengths of appliance conductors, but if conductors of greater length are preset by the hand wheel 58 as required, the cord stock 9 will build up faster to form the slack or loop 292 and a cord support 150 is then desirable before the leading cord end is gripped by the clamp 103. If the speeds are adjusted to produce shorter conductors, the velocity of the shuttle 207 will be greater than that of the pinch rollers 80 and of the cord 9, and the shutle 207 will then pull the cord and rollers ahead of the driving mechanism due to the action of the one-way drive clutch gear 61.

The various insulation slitting and stripping and terminal attaching and unloading units 21, 22 are all mounted upon an inverted elongated channel bar 300 carried at one end by the table 30 and supported at its oposite end by the legs 26 (FIGS. 1a and 2), and which is connected to the channel bar 24 by strong bracing. The several operating units are all connected to a long propelling shaft 302 which is driven through a speed reducer 303, a chain drive 304, and a sprocket 305 from the main drive shaft 41, and the shaft 302 is rotatable at precisely the same speed as the main cam and indexing shaft 32 and is journalled in bearings carried by the channel bar 300. The chain drive 304 may also be operated by a hand wheel 301 for manual adjustment or setting of the mechanism, and the end unloading unit is disposed at the unloading station 21' while the other units 21 which may be two or more in number are located in spaced relation to and in advance of the final unit 22 (FIGS. 1a and 1b).

The unloading unit 22 comprises in general a conveyor clamp releasing mechanism 309, a conductor pick-up and transfer device 310, and an open ended conductor receptacle, all cooperating to provide a finished conductor collector 311 operable by a multi-grooved cam 312 on the drive shaft 302.

When the successive cord ribbon lengths 15 have had their leading and trailing ends disposed flatwise in the same plane and gripped by the adjacent carrier clamps 103, 104, respectively, with the severed ends 16 thereof protruding definite distances from these clamps, the conveyor 14 is intermittently advanced to tranport the cord laden carriers 20 with the looped cords 15 depending therefrom and to momentarily hold the cord lengths in the several stations or units 21 while work is being performed on their ends 16 (FIGS. 1a and 1b).

In the initial unit 21 shown in FIGS. 1a, 18, 19, and 20, is located a pair of laterally separated tools constituting a device 371 adapted to actuate a number of cooperable stripping blades 372 and slitting blades 373 for stripping and slitting the insulation at the extreme ends of the projecting cable ends 16 to bare and separate these wire ends so that terminals may be attached thereto. This device 371 is bodily movable away from the cord ends 16 when it is desirable to strip the insulation from the wire ends, and cutting blades may also be added if it is desired to cut some of the component wires to different lengths in order to produce so-called stagger-stripped cord ends. The tool assemblage or device 371 is mounted upon the beam 300, and the upper blades 372 are carried by a slide 374 while the lower blades 373 are carried by a slide 375 both of which coact with an upright plate 376 and are held thereagainst by gibs 377 and racks 378. The racks 378 coact with a pinion 379 on one end of a spline shaft 380 journalled in a tube 381 attached to the slide supporting plate 376 and which is slidable within a bearing 384 on the frame 386. The tube 381 has attached thereto a block 382 carrying a leader pin 383 which is likewise slidable in a bearing on the frame 386, and said clamping block 382 which is reciprocable by a link 387 and a cam lever 388 coacting with a cam groove in one side of a cam 389 secured to the drive shaft 302.

The spline 390 of the shaft 380 is drivingly connected to a crank 391 which is connected by a link 392 and a cam lever 393 with a cam groove in the opposite side of the cam 389. This slitting and stripping mechanism is automatically operable when the driving shaft 302 is operating to periodically cause the blades 372, 373 to approach the ends of the successive looped cord lengths 15 and to slit the insulation between these ends and to spread the same while also stripping the slitted insulation off of the ends of the wires so that terminals may be subsequently attached thereto by subsequent units. The device 371 may be modified by the provision of tools of various types adapted to perform diverse operations, depending upon the kind of conductors that the machine is intended to produce.

Figure 22:
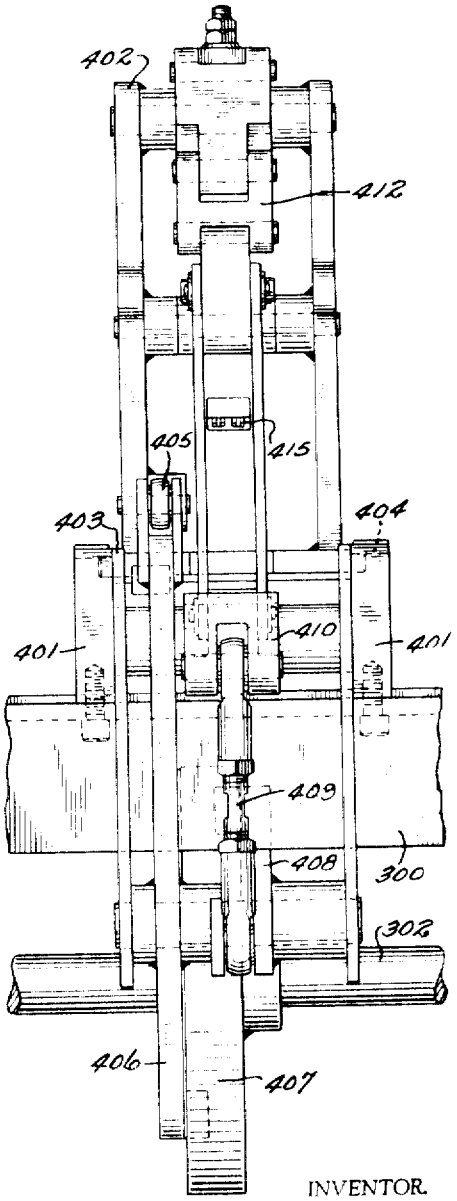
FIG. 22 is an enlarged side view of the mechanism shown in FIG. 21.
Figure 21:
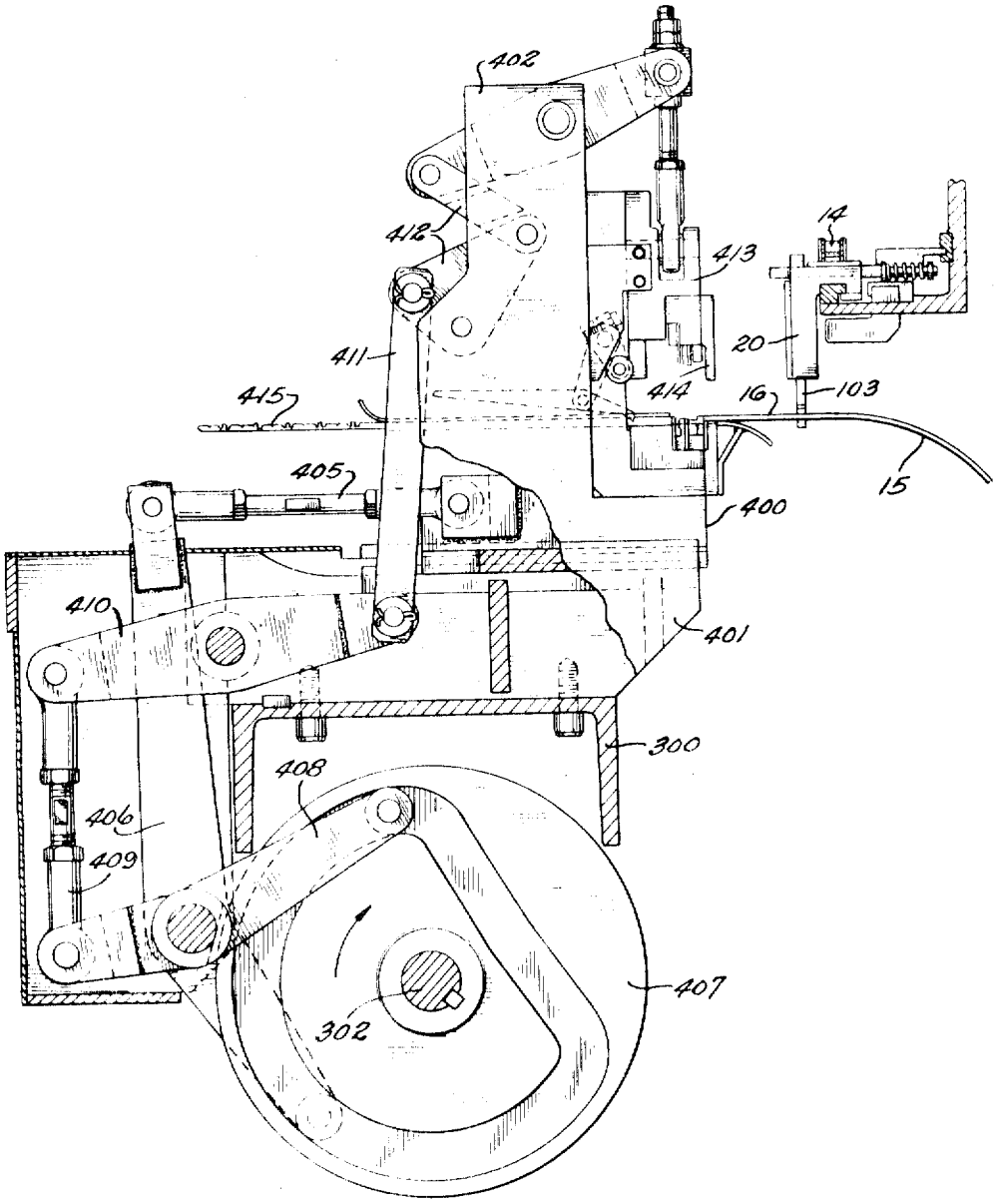
FIG. 21 is an enlarged end elevation of one of the terminal attaching devices and the driving cam thereof, taken along the line G—G of FIG. 3b.
Figure 29:
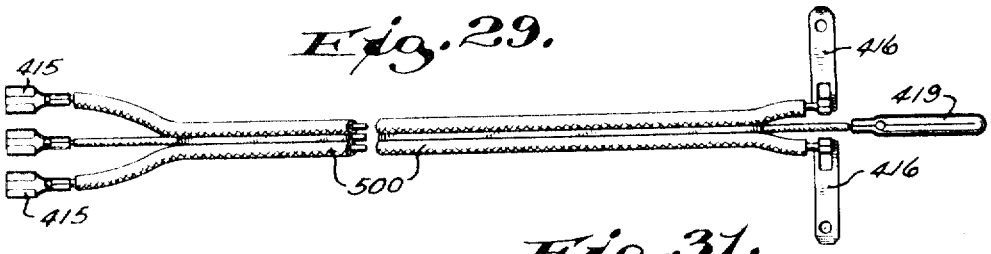
FIG. 29 is a plan view of one type of finished conductor showing various types of terminals attached to a ribbon cord length.
Figure 30:
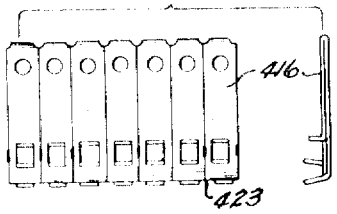
FIGS. 30 to 37 show various types of terminal strips which may be fed into the machine to produce conductors of various kinds.
Figure 31:
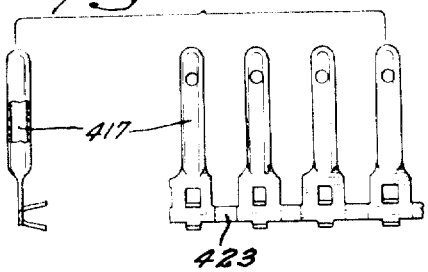
Figure 32:
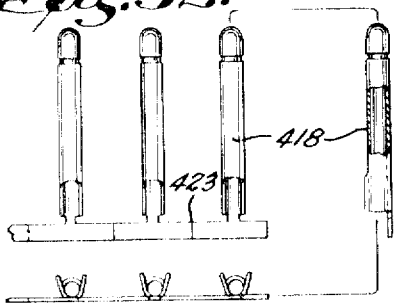
Figure 33:
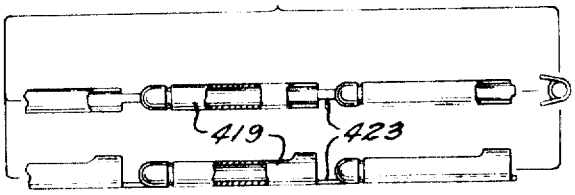
Figure 34:
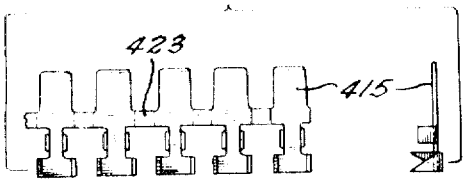
Figure 35:
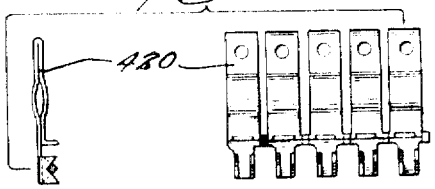
Figure 36:
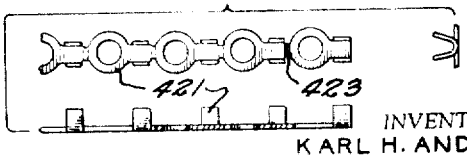
Figure 37:
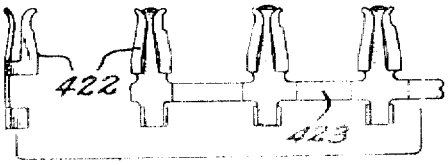

When the ends 16 of the cord lengths 15 have been properly slitted and separated, the carriers 20 are successively and intermittently advanced in the conveyor 14 through one or more terminal applying mechanisms 399, 400, such as shown in FIGS. 1b, 21 and 22. These terminal applying mechanisms may be readily adapted to produce finished conductors of variable length from terminal strips such as shown in FIGS. 30 to 37 inclusive as well as others, and a typical finished three-wire cord conductor 500 embodying terminals similar to the types shown in FIGS. 30, 32 and 34 is shown in FIG. 29. As depicted in FIGS. 1b, 21 and 22, the mechanism 399 is adapted to simultaneously attach a terminal 415 of the end connected general type shown in FIG. 36 to each of the end stripped wires at one end 16 of the cord, while other terminals are being attached to the barbed wire ends of the other end of a cord 15 by a similar mechanism 400 located in a subsequent zone or station 21.

Such a mechanism is shown in FIGS. 21 and 22 and comprises in general a base 401 mounted on the channel 300 and supporting a press 402 adapted to slide along a key 403 secured to the base 401 by gibs 404. The press 402 is adapted to be retracted after terminal attaching relative to the base 401 by a link 405 and a cam lever 406 cooperating with a groove on one side of a cam 407 mounted on the drive shaft 302, and another cam lever 408 which coacts with a groove on the opposite side of the cam 407 is connected by another link 409, a second lever 410, and still another link 411 with a toggle linkage assemblage 412 coacting with a reciprocable tool slide 413 carrying the terminal crimping tools 414. The successive terminals of the strip 415 and of the other types of strips are interconnected either laterally or endwise by thin webs which are severed from the strips by the mechanism in a well-know manner, and several types of terminals may be applied to either or both ends 16 of a flat ribbon cord 15 simultaneously.

Figure 26:
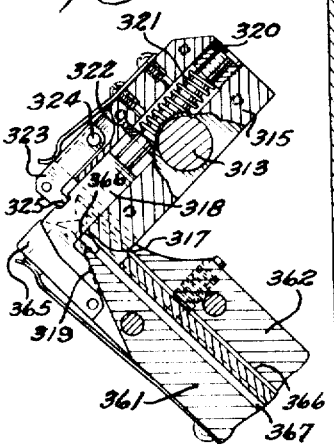
FIG. 26 is an enlarged transverse vertical section through the conductor pick-up mechanism taken along the line F—F of FIG. 23, showing the transfer elements in final delivering position.
Figure 28:
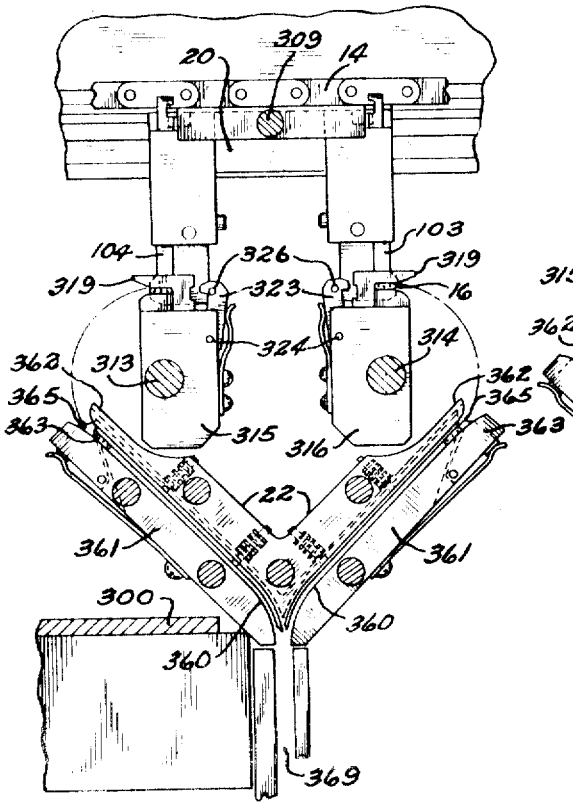
FIG. 28 is another similar view showing the position of the elements while picking up another completed conductor.
Figure 27:
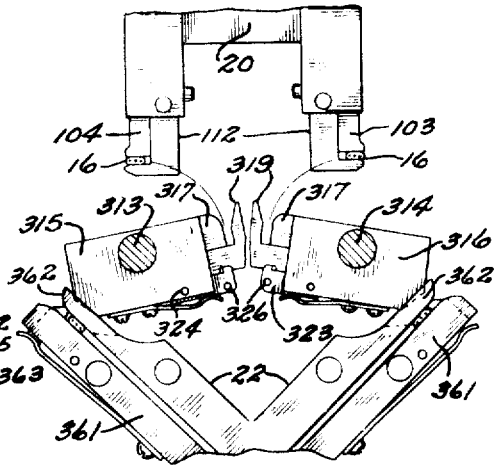
FIG. 27 is a similar section showing the transfer elements in position ready to receive a subsequent conductor.

The final conductor discharge and collecting unit 22 which is located at the unloading station 21' comprises a clamp release mechanism 309 and a conductor pick-up and transfer mechanism 310 cooperating to provide a finished conductor collector 311 which is operable by a multi-grooved cam 312 also mounted on the drive shaft 302 (FIGS. 1b, 3b, 23 and 24). As shown in FIGS. 27 and 28, the conductor transfer mechanism 310 has parallel shafts 313, 314 which are simultaneously oscillatable in opposite directions and are axially movable, and these shafts have pick-up heads 315, 316 attached thereto respectively adapted to engage both ends 16 of the successive conductors near their carriers 20 while these conductors are still held in the clamps 103, 104. Each of the heads 315, 316 has its end provided with an anvil 317 for receiving one of the juxtapositioned conductor ends 16, and each head 315, 316 is slotted to receive a square plunger 318 provided with a hook 319 coacting with the adjacent anvil 317 and which has a nut 320 at its end remote from its hook as shown in FIG. 26. The nut 320 of each plunger 318 is engaged by one end of a compression spring 321, the opposite end of which coacts with a fixed plate 322 and the slot in the head is closed by a detachable cover.

Figure 23:
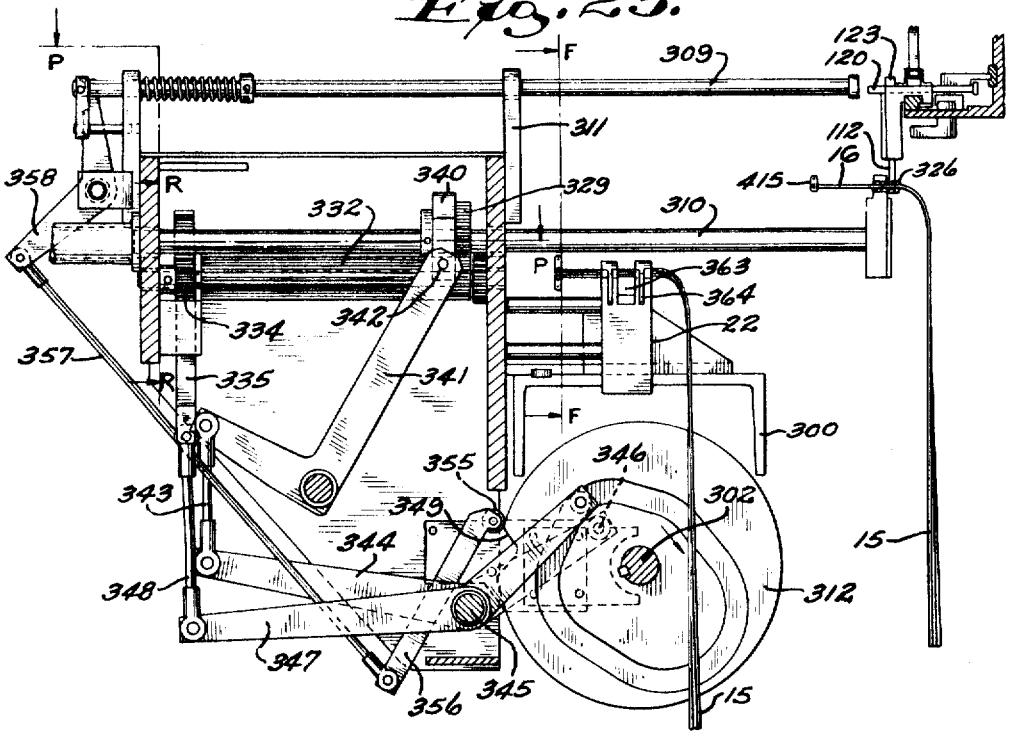
FIG. 23 is an end view of one type of finished conductor collecting mechanism of the machine.
Figure 24:
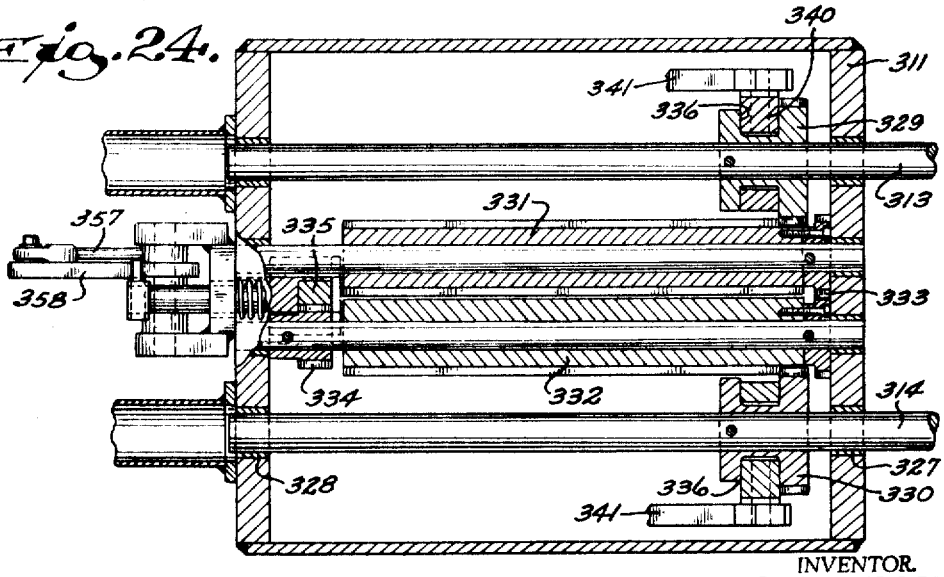
FIG. 24 is an enlarged horizontal section through the mechanism of FIG. 23 taken along the line P—P.
Figure 25:
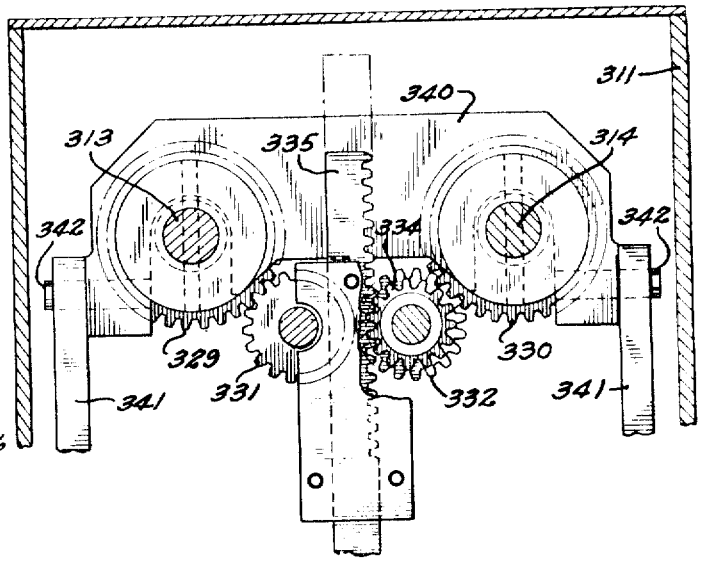
FIG. 25 is an enlarged vertical transverse section through the mechanism of FIG. 23 taken along the line R—R.

A spring pressed latch 323 which is pivoted on a pin 324 is normally held in engagement with a notch 325 in the plunger 318, and a pin 326 projecting laterally from the swinging end of each latch 323 serves to release the same on contact with anvil 112 on carrier 20 and to thereby trip the adjacent plunger 318 and cause its hook 319 to clamp the intervening cord end 16 against the adjacent anvil 317 as in FIG. 28. The shafts 313, 314 are journalled in bearings 327, 328 in the housing of the collector 311 as shown in FIGS 24 and 25, and are operable for rotation and axial movement by interconnected gears 329, 330 meshing with elongated gears 331, 332 which in turn are interconnected by other gears 333 driven by a pinion 334 and a rack 335. The gears 329, 330 have annular grooves 336 which are engaged by a shifting member 340 pivoted upon a fork 341 by pins 342 as shown in FIG. 23. This shifting fork 341 is operable by a link 343 secured to one end of a cam lever 344 fulcrumed on a shaft 345, and the opposite end of which carries a roller 346 coacting with a groove in one side of the rotary cam 312. Located adjacent to the cam lever 344 is another lever 347 which is also fulcrumed on the shaft 345 and coacts with a groove on the other side of the cam 312, this lever 347 being connected by another link 348 with the rack 335 so as to oscillate the shafts 313, 314 and swing the heads 315 to and fro in accordance with the timing of the mechanism.

The rotary cam 312 is also provided with a cam notch 349 which is adapted to be engaged by a roller 355 carried by one end of still another lever 356 also fulcrumed on the pivot shaft 345 and the opposite end of which is connected by a link 357 with an arm of a bell crank 358, the other arm of which is cooperable with the spring loaded conductor release plunger 309 as depicted in FIG. 23. This plunger 309 is operable to release the carrier clamps 103, 104 by engaging and pressing the projecting locking slides 123 of the carriers 20 and thus releasing the clamping slides 113 (see FIG. 17). When the conveyor 14 transports the successive clamps 20 with a finished cord conductor suspended in loop formation into the unloading station 21', the transfer pick-up 310 approaches the adjacent carrier 20 with the heads 315, 316 swung apart as in FIG. 27, and these heads are then swung upwardly and outwardly to cause the conductor ends 16 to enter the gaps between the anvils 317 and the hooks 319. As the projecting pins 326 on the latches 323 encounter the anvils 112, the spring loaded plungers 318 will subsequently be released to cause the hooks 319 to grip the conductor ends, whereupon the carrier clamps 103, 104 are released by release plunger 309, and the pick-up shafts 313, 314 begin their movement toward the receptacle 22, and these shafts are also partially rotated by the gears 329, 330 so as to dislodge the conductor ends laterally as well as longitudinally from within the open jaws of the carrier 20.

The finished conductor receptacle 22 has a pair of open paths 360 formed by cooperating oppositely inclined lower members 361 and by a similarly V-shaped upper member 362 bolted to the conductor collector 311 (FIGS. 26, 27, 28). The lower members 361 have angular slots 363 therein which provide wedge shaped cam grooves and also has narrower similar slits 364 each containing a spring pressed latch 365 for confining the finished conductors after they have entered the gap between the members 361 and 362. The upper member 362 is also provided with a central keyway 366 within which a floating key 367 retained by a suitable spring is confined so as to produce a drag on the successive cords 15 advancing between the cooperating members 361, 362. When the transfer pick-up with its heads 315, 316 is advanced to a position above the receptacle 22, the cam 312 and the associated gears cause the heads 315, 316 to dip lower and to insert the advancing cable ends 16 of each conductor between the spaced members 361, 362 thereby causing the cord ends 16 to push the latches 365 into position where they will snap over this cord. Simultaneously, the heads 315, 316 will then enter the hooks 319 in the slots 363, and as these hooks slide along the wedge shaped slots 363, the adjacent square plungers 318 will be forced to release the cord 15 and so permit the latches 323 to enter the adjacent slots 325 and to thus reset the corresponding head 315 for the next pick-up. The paths 360 may be arranged to remain separate for individual collection of the leading ends and of the trailing ends of the finished conductors, or they may be formed to meet and drop into the receiver 369 as shown in FIGS. 23 and 28 from which they may be withdrawn either manually or with the aid of a suitable conveyor.

As previously indicated, the terminals may be of varionus standard types supplied by the manufacturers in strip formation with the successive individual terminals interconnected by thin feed webs 423 or parting areas as shown in FIGS. 30 to 37 inclusive adapted to be severed in the attaching units 21. The terminals 415, 416, 417, 418, 419, 420, 421 and 422 are all formed of current conducting sheet metal, and the terminals 417, 418, 419 are of the pin type adapted to be applied axially of the stripped ends of the wires, while the other terminals 415, 416, 520, 421, 422 may all be applied to these ends either laterially or longitudinally of the wires. As depicted in FIG. 29, the opposite ends of each severed length 15 of cord ribbon containing two or more insulated interconnected but insulation covered wires must initially be severed, laterally spread apart or separated, and also stripped if necessary, whereupon one end of the cord length may be provided with laterally applied terminals 415 on all three strands, and the opposite end of the ribbon may be provided with a pin terminal 418 or 419 applied longitudinally of the central strand and with terminals 416 applied laterally of the outer wires to complete the conductor 500.

When the machine has been properly constructed, assembled, and adjusted to produce the desired type of conductors, it may be operated to rapidly and effectively produce electrical conductors in the manner illustrated in the timing diagram or chart of FIG. 38 wherein the functioning of the various parts during one conductor production cycle is shown. The feed rollers 80 of the feeding device 10 are continuously rotating and withdrawing cord 9 from the supply reel 8 thereby paying out a minor wire loop 292 while the severed first end of said loop is firmly held in the leading clamp 103 of a stationary second carrier 20'. As the loop grows as shown in FIG. 9 and nears its predetermined length at 285°, the conveyor 14 has started indexing, and the pinch rollers 80 separate momentarily by cam rods 90 while the gripper 231 clamps by spring plunger operated slide 257 onto a median portion of the cord 9 and advances with same through the separated rollers, and said gripper is propelled by the reciprocating shuttle 207 toward and through the indexing conveyor 14 which carries the leading end of cord loop 15'.

During the last portion of shuttle feed, the oncoming open leading clamp 103 of the next carrier 20' embraces the cord 9 guided by device 17, and when the indexing of the conveyor stops at 360°, said clamp 103 firmly clamps the cord actuated by the spring loaded plunger 130. The cutting device 13 then severs the cord between clamp 103 and the gripper 231, and said gripper actuated by rack 242 proceeds to swing around with the trailing end 16 of the severed cord loop 15' in order to present same in a flat juxtaposition to the trailing end clamp 104 of the carrier 19.

The gripper 231 is accurately positioned for transfer of the cord 15' by the cam driven shuttle 207, and the shuttle arm 227 which is carrying the gripper 231 is transversely driven by roller 180 actuated by the cam controlled grooved bar 179 to exactly locate said arm by the stationary dowel block 278 in relation to the trailing clamp 104 and to insert the cord end 16 therein, whereupon said clamp 104 is actuated by spring plunger 142 to firmly clamp said cord end, and the gripper 231 is thereupon released from said cord by tripping of the latch pin 271 by the cam operated plunger 277 pressing on the projection 273. The shuttle arm 227 then pulls out of the engagement with the dowel block 278 and the shuttle 207 thereupon returns to its starting position and the gripper 231 swings back to its starting position while he pinch rollers are continuously paying out another length of cord.

The conveyor 14 and the loaded carrier 20 subsequently intermittently advance the looped cable length 15 past the initial station 21 wherein its opposite ends are slitted, stripped if necessary, and perhaps otherwise conditioned for the reception of the terminals in timed relation with the conveyor. Upon leaving the initial station 21, the conveyor 14 is operated to transfer the end conditioned cable 15 through one or more properly timed terminal attaching stations and to finally transfer the completed conductor to a receptacle in an unloading station 21' where the cord is released from the conveyor 14 by the cam operated release mechanism 308, and the finished article is neatly deposited to conclude the cycle of operations.

When short conrductors of less than four feet in length are being produced, the mechanism will complete as many as four thousand conductors per hour, but when longer conductors up to fifteen feet in length are being produced, this speed will be somewhat proportionately less, around three thousand or more depending on the weight and the condition of the reel 8. Such high speed of production is possible because the cord 9 is payed out from the reel 8 at a substantially uniform speed while the cords 15 are being measured and cut to length and loaded on the conveyor with the ends in flat juxtaposition and spaced to permit various combinations of stagger stripping and slitting [and to provide] *operations to be performed in a common plane all from the same side while providing* sufficient space within the terminal attaching zones to permit simultaneous attachment of diverse types of terminals to both cord ends either laterally or axially of the several wires. The machine is also capable of producing successive conductors of minimum length variation and with exact location of the terminals in relation to the ends of the wires, and *since all operations are performed from one side as the conductors are conveyed along a rectilinear path* the finished conductors are deposited within the receptacle 21′ *remote from the initial wire feeding station* in neat and untangled order so that they may be readily removed either manually in accumulated batches or successively by a suitable conveyor. *Also, ready access may be had at any time to both sides of the conveyor, and the looped portions of the conductors between the carrier clamps are permitted to hang freely to enable operation on all lengths of wires without need for providing for the support of the loops.*

Various modes of carrying out the invention are contemplated as being within the scope of the following claims particularly pointing out and distinctly claiming the subject matter [with] which is regarded as the invention.

I claim:

1. Apparatus for producing electrical conductor components comprising, a supply source for a continuous strand of insulated wire stock, [a] *an endless* conveyor *chain traversing laterally spaced sprocket wheels for movement thereof* [movable] *longitudinally* along a given *rectilinear* path *between said sprocket wheels* and provided with a plurality of wire carrier clamps spaced in single file *therealong* [along the path], a work station laterally of said conveyor *chain* on one side of said path, means for withdrawing wire from said supply source and for feeding *a predetermined length of* the same to [one] *a pair* of said carrier clamps *near one end of said path adjacent one of said sprocket wheels* for gripping *by said pair of clamps* [thereby] *with the intermediate portion of the gripped wire between said clamps freely suspended in a depending loop and with the gripped portions thereof juxta-positioned,* means for severing the *wire strand* [gripped portion of the] *to free said* [wire into a] predetermined length *thereof,* [and] means for [feeding the severed end of the wire length to an adjacent carrier clamp for gripping thereby] *moving said conveyor chain along said path* with the gripped ends of the severed wire length juxta-positioned and protruding from said clamps in a common direction *and with the intermediate looped portion freely suspended,* whereby said wire length is advanced by said conveyor *chain* to said work station with both ends of said wire length in position to be worked upon from a common side of said conveyor *chain* and its path of movement, *and means near the opposite end of said path adjacent the other of said sprocket wheels remote from said supply source for receiving the wire length from said conveyor chain.*

2. Apparatus for producing electrical conductor components according to claim 1, wherein the wire carrier clamps are disposed in spaced pairs on the conveyor, and the clamps of each pair have oppositely directed jaws.

3. Apparatus for producing electrical conductor components according to claim 1, wherein a plurality of work stations are provided, one of which includes means for stripping the insulation from the ends of the wire lengths, and another of which includes means for applying terminals to the stripped ends, both of said work stations being positioned on the same side of the conveyor and its *rectilinear* path of movement.

4. Apparatus for producing electrical conductor components according to claim 1, wherein the wire stock has multiple strands, and the work station includes a cutter for longitudinally slitting the ends of the wire lengths to laterally separate the same for receiving individual terminals.

5. Apparatus for producing electrical conductor components according to claim 1, wherein [the conveyor is of the endless chain type with all of] the wire carrier clamps *project outwardly from the conveyor chain in a vertical plane* [being movable past the work station in a rectilinear path and in a common plane].

6. Apparatus for producing electrical conductor components according to claim 1, wherein the means for withdrawing wire from the supply source[,] and for feeding the same to the carrier clamps includes a pair of draw rolls and a reciprocating shuttle.

7. Apparatus for producing electrical conductor components comprising, a supply source for a continuous strand of insulated wire stock, a conveyor movable along a given path, a plurality of wire carrier members on said conveyor spaced from each other for movement in single file along the path, each of said carrier members embodying a pair of adjacent spaced clamps, a work station laterally of the path of movement of said carrier members, means for withdrawing wire from said supply source and for advancing successive lengths of the same beyond the path of movement of the first clamp of each of said carrier members, means for advancing said conveyor to move said first clamp into position whereby it clamps the wire, means for severing the wire a spaced distance beyond said first clamp, and means for turning the trailing end of each of the successive severed wire lengths to bring the same into juxta-position with the previously severed end while positioning said trailing end in the second clamp of the [preceding] carrier member for clamping thereby, whereby the successive wire lengths are advanced by said conveyor to said work station with both ends of said wire length in position to be worked upon from a common side of the path of movement.

8. Apparatus for producing electrical conductor components according to claim 7, wherein the means for withdrawing successive lengths of wire from the supply source and for advancing the same beyond the first clamp includes a repicrocating feeder.

9. Apparatus for producing electrical conductor components according to claim 8, wherein the reciprocating wire feeder has a wire gripping head pivotally mounted thereon for swinging movement at the end of each feeding stroke to turn the trailing end of each wire length and bring the same into juxtaposition with the previously severed end.

10. Apparatus for producing electrical conductor components according to claim 7, wherein the work station includes means for applying terminals to the ends of the successive severed lengths of wire as they are conveyed by the wire carrier members.

11. Apparatus for producing electrical conductor components according to claim 10, wherein a second work station including means in advance of the terminal applicator for preparing the ends of the successive wires for receiving the terminals is provided on the same side of the conveyor and its path of movement.

12. Apparatus for producing electrical conductor components according to claim 8, wherein the means for withdrawing successive lengths of wire from the supply source is a pair of draw rolls, and the means for advancing the same to the first clamp is a reciprocating shuttle.

*13. Apparatus for producing successive lengths of electrical conductor components compising, a supply source for a continuous strand of insulated wire stock, an intermittently operable cutter for severing said wire strand, means for withdrawing said wire strand from said supply source and for advancing the same longitudinally predetermined distances beyond said cutter in timed relation with the operation thereof to provide a succession of wire lengths, transfer means including an element for gripping one end of each successive wire length and reversing the same to loop the wire length and orient the opposite ends thereof in predetermined laterally spaced juxtaposition and pointed in a common direction, an endless conveyor chain traversing laterally spaced sprocket wheels for movement thereof longitudinally along a given rectilinear path between said sprocket wheels and extending transversely of the wire axes at the juxatpositioned ends thereof, said conveyor chain being provided with a plurality of wire carrier clamps spaced in single file therealong for firmly gripping each successive length of looped wire inwardly of each end thereof to maintain the protruding ends in spaced juxtaposition and in substantially parallel*

*relation with the loop freely suspended, means for intermittently moving said conveyor chain and the clamped lengths of looped wire successively away from said cutter along the rectilinear path, means for applying a terminal to at least one juxtapositioned end of each successive looped wire length while at rest to complete the conductors, and means beyond said terminal applicator remote from said cutter and adjacent one of said sprockets for removing the successive conductors from the clamps of said conveyor chain.*

*14. Apparatus for producing successive lengths of electrical conductor components according to claim 13 wherein the wire carrier clamps project outwardly from the conveyor chain in a vertical plane.*

References Cited by the Examiner

The following references, cited by the Examiner, are of record in the patented file of this patent or the original patent.

UNITED STATES PATENTS

| | | | |
|---|---|---|---|
| 2,613,427 | 10/1952 | Adams | 29—33.10 |
| 2,764,237 | 9/1956 | Adams | 29—33.51 |
| 2,976,895 | 3/1961 | Durham | 140—102 |
| 3,032,860 | 5/1962 | Andren | 29—33.51 |

RICHARD H. EANES, JR., *Primary Examiner.*